(12) United States Patent
Hood et al.

(10) Patent No.: US 12,243,040 B2
(45) Date of Patent: *Mar. 4, 2025

(54) SAVINGS EDUCATION AND MANAGEMENT SYSTEM

(71) Applicant: My First Nest Egg, LLC, Phoenix, AZ (US)

(72) Inventors: Nicolle S Hood, Phoenix, AZ (US); Annamarie Shoen, Paradise Valley, AZ (US)

(73) Assignee: My First Nest Egg, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,846

(22) Filed: Apr. 23, 2024

(65) Prior Publication Data

US 2024/0273504 A1    Aug. 15, 2024

Related U.S. Application Data

(63) Continuation of application No. 17/515,454, filed on Oct. 30, 2021, now Pat. No. 11,966,905.

(Continued)

(51) Int. Cl.
*G06Q 20/32* (2012.01)
*G06Q 20/10* (2012.01)
(Continued)

(52) U.S. Cl.
CPC ....... *G06Q 20/3223* (2013.01); *G06Q 20/108* (2013.01); *G06Q 20/3274* (2013.01); *G06Q 30/0209* (2013.01); *G06Q 30/0279* (2013.01)

(58) Field of Classification Search
None
See application file for complete search history.

(56) References Cited

U.S. PATENT DOCUMENTS

| | | | | |
|---|---|---|---|---|
| 7,195,153 | B1 * | 3/2007 | Green | G07F 19/20 235/375 |
| 10,482,462 | B1 * | 11/2019 | Eidam | G06F 3/0482 |

(Continued)

OTHER PUBLICATIONS

"Imani, Faizah, How to submit photos for Jigsaw Puzzles, Jan. 4, 2019" (Year: 2019).*

*Primary Examiner* — Christopher Bridges
*Assistant Examiner* — Toan Duc Bui
(74) *Attorney, Agent, or Firm* — Thomas W. Galvani, P.C.; Thomas W. Galvani

(57) ABSTRACT

An improved savings education and management system includes a base unit including a processor, non-transitory computer-readable memory, a display, and buttons, wherein the base unit includes a housing which presents an appearance of an egg. A mobile unit includes a processor, non-transitory computer-readable memory, and a display. A computer server includes a processor and non-transitory computer-readable server memory storing a database including a user account, the user account having financial accounts and corresponding to the base unit and the mobile unit. The base unit includes instructions stored in the memory that present on the display information related to the user account which corresponds to the one of the buttons. The mobile unit includes mobile instructions stored in the memory that transmit an instruction to the computer server to debit one of the financial accounts.

20 Claims, 18 Drawing Sheets

Related U.S. Application Data

(60) Provisional application No. 63/180,618, filed on Apr. 27, 2021, provisional application No. 63/163,791, filed on Mar. 20, 2021, provisional application No. 63/121,113, filed on Dec. 3, 2020, provisional application No. 63/107,852, filed on Oct. 30, 2020.

(51) Int. Cl.
    *G06Q 30/0207* (2023.01)
    *G06Q 30/0279* (2023.01)

(56) References Cited

U.S. PATENT DOCUMENTS

| | | | |
|---|---|---|---|
| 11,594,033 B2* | 2/2023 | Khan | G06V 40/103 |
| 2005/0010525 A1* | 1/2005 | Ross | G07D 11/12 |
| | | | 705/43 |
| 2013/0079719 A1* | 3/2013 | Gyrn | A61M 5/158 |
| | | | 604/134 |
| 2014/0255889 A1* | 9/2014 | Grimes | G06Q 30/0207 |
| | | | 434/236 |
| 2015/0352435 A1* | 12/2015 | Imai | A63F 13/92 |
| | | | 463/9 |
| 2017/0055655 A1* | 3/2017 | Meyers | G06Q 20/108 |
| 2017/0282055 A1* | 10/2017 | McKevitt | G07F 17/34 |
| 2019/0005474 A1* | 1/2019 | Cady | G06Q 40/02 |
| 2019/0066089 A1* | 2/2019 | Miryala | G06Q 20/367 |
| 2019/0280348 A1* | 9/2019 | Fukushima | H02J 7/0068 |
| 2019/0318326 A1* | 10/2019 | Russell | G06Q 20/3276 |
| 2019/0356939 A1* | 11/2019 | Kuo | H04N 21/4438 |
| 2021/0398100 A1* | 12/2021 | Gabriele | G06Q 20/389 |
| 2022/0101294 A1* | 3/2022 | Mahanti | G07G 1/14 |
| 2022/0391972 A1* | 12/2022 | Takimoto | G06Q 10/10 |

* cited by examiner

SAVINGS EDUCATION AND MANAGEMENT SYSTEM

CROSS-REFERENCE TO RELATED APPLICATIONS

This application is a continuation of and claims the benefit of U.S. patent application Ser. No. 17/515,454, filed Oct. 30, 2021, which claims the benefit of U.S. Provisional Application No. 63/107,852, filed Oct. 30, 2020, and claims the benefit of U.S. Provisional Application No. 63/121,113, filed Dec. 3, 2020, and claims the benefit of U.S. Provisional Application No. 63/163,791, filed Mar. 20, 2021, and claims the benefit of U.S. Provisional Application No. 63/180,618, filed Apr. 27, 2021, all of which are hereby incorporated by reference.

FIELD

The present specification relates generally to money management tracking systems, and more particularly to money management, tracking, and educational systems for children.

BACKGROUND

Piggy banks are a part of childhood. Most children have a piggy bank somewhere in their room; all children recognize the familiar porcine repository. Unfortunately, the ubiquity of the piggy bank has not translated into financial literacy. Children forget about the banks, or they forget about the cash within them. While convenient ways to store physical cash and coins, traditional piggy banks hide money and so are actually an incredibly poor method of tracking assets and learning about finances. As the old adage goes: out of sight, out of mind. A way to visualize saved money is needed.

Piggy banks are also relics in an increasingly digital world. Purchasing has moved online, payment systems are online, banking is online, and investments are online. This movement away from brick and mortar stores means the tangible money that children do save in their piggy banks is in a way unusable to purchase many of the toys and other items they want to purchase online. Moreover, as online finances become more prevalent, any savings or financial literacy gained from a physical piggy bank will become less relevant. A system for educating children about finances in the modern, digital world is needed.

Children respond well to instant gratification. Parents often encourage children to complete chores, get good grades, avoid cavities, and do a variety of other tasks, often providing incentives in the form of physical money. But that money can quickly become a meaningless abstraction to children if they cannot easily use it to purchase goods or if their parents cannot take them shopping soon after earning the money. In addition, parents must have the exact change available to them to provide the financial or monetary incentives, but they often lack cash in an increasingly cashless world. A system for clearly and quickly illustrating to a child a connection between a chore, a grade, or another achievement and a thing of value is needed.

Financial management, consistent savings, chores, goal setting, goal tracking; each of these is a skill that a child generally must practice to learn. Systems for teaching children about financial concepts and skills exist, but they can be dull, non-engaging, or overly complicated. Savings systems may be more approachable but generally do not provide the child with much in either instant or delayed gratification; few children are satisfied merely by seeing an increase in an abstract number representing the balance on a savings account in a far-off bank. Goal setting and tracking is a disciplined skill, like financial management, that can be difficult for children to appreciate, understand, and adhere to. An improved way to teach children goal setting, goal tracking, and patience is needed.

SUMMARY

An embodiment of an improved savings education and management system allows children to monitor dedicated, earmarked accounts representing spending funds, savings funds, and donation funds. Deposits to the system are allocated among those accounts according to an allocation schedule. Children can watch their accounts grow. Parents can incentivize good behaviors and acts with puzzle gamification, in which the child's completion of tasks earns pieces to a virtual puzzle, and completion of the virtual puzzle allows the child redeem a real-world prize. Additionally, the system includes a base unit, which may be egg-shaped, that glows, sounds, or vibrates when money is deposited into the child's account; the child can interact with the egg to view account information.

An embodiment of an improved savings education and management system includes a base unit including a base processor, non-transitory computer-readable base memory, a base display, and buttons, wherein the base unit includes a housing which presents an appearance of an egg. A mobile unit includes a mobile processor, non-transitory computer-readable mobile memory, and a mobile display. A computer server includes a server processor and non-transitory computer-readable server memory storing a database including a user account, the user account having financial accounts and corresponding to the base unit and the mobile unit. The base unit includes instructions stored in the base memory that present on the base display information related to the user account which corresponds to the one of the buttons. The mobile unit includes mobile instructions stored in the mobile memory that transmit an instruction to the computer server to debit one of the financial accounts.

In embodiments, the housing of the base unit is mounted on a stand, and the stand includes a drawer mounted for reciprocation between open and closed positions. The housing is mounted for pivotal movement on the stand. The display is recessed within a window in the housing. The server includes server instructions that, when executed on the server processor in response to deposition of funds into the user account, instruct the base unit to trigger an annunciation from the base unit, the annunciation including at least one of a sound, a light, and a haptic event. A website is provided by the computer server and displays the information related to the user account to allow a user to deposit funds into the user account, define an allocation schedule for allocating the funds within the user account, and track charitable acts.

An embodiment of an improved savings education and management system includes a computer server includes a server processor and non-transitory computer-readable server memory storing a user account, the user account including a spend account, a save account, and a give account. Server instructions are stored in the server memory that, when executed on the server processor in response to deposition of funds into the user account, allocate the funds into the spend account, save account, and give account according to an allocation schedule. A base unit includes a base processor, non-transitory computer-readable base memory, a base display, and buttons identified as spend, save, and give buttons. Base instructions are stored in the base memory that, when executed on the base processor in response to the spend, save, or give buttons being selected, present on the base display the funds in the spend, save, and give accounts, respectively.

In embodiments, the user account further includes a charitable acts account. The spend account, save account, and give account are financial accounts for tracking funds, and the charitable acts account is a transactional account for tracking charitable acts and descriptions and evidence thereof. A puzzle gamification includes server instructions stored in the server memory that, when executed on the server processor, allow a user to create a puzzle from a photograph of a desired goal, sequentially place puzzle pieces in response to a task completion until the puzzle is completed, and then redeem the desired goal in response to the puzzle being completed. The base unit includes a housing which presents an appearance of an egg. The housing of the base unit is mounted on a stand, the stand including a drawer mounted for reciprocation between open and closed positions. A mobile unit includes a mobile processor, non-transitory computer-readable mobile memory, a mobile display, and mobile instructions stored in the mobile memory that, when executed on the mobile processor in response to payment information on the mobile display being scanned, transmit an instruction to the computer server to debit the spend account. A website is provided by the computer server and displays information related to the user account to allow a user to deposit funds into the user account, define the allocation schedule, and track charitable acts.

An embodiment of an improved savings education and management system includes a computer server including a server processor and non-transitory computer-readable server memory storing a user account, the user account including a spend account, a save account, and a give account. Instructions are stored in the server memory that, when executed on the server processor in response to deposition of funds into the user account, allocate the funds into the spend account, save account, and give account according to an allocation schedule. A mobile unit includes a mobile processor, non-transitory computer-readable mobile memory, and a mobile display. Mobile instructions are stored in the mobile memory that, when executed on the mobile processor in response to payment information on the mobile display being scanned, transmit an instruction to the computer server to debit the spend account.

In embodiments, the user account further includes a charitable acts account. The spend account, save account, and give account are financial accounts for tracking funds, and the charitable acts account is a transactional account for tracking charitable acts and descriptions and evidence thereof. A puzzle gamification includes server instructions stored in the server memory that, when executed on the server processor, allow a user to create a puzzle representing a desired goal, sequentially place puzzle pieces in response to a task completion until the empty puzzle is completed, and then redeem the desired goal in response to the puzzle being completed. A base unit includes a base processor, non-transitory computer-readable base memory, a base display, buttons identified as spend, save, and give buttons, and instructions stored in the base memory that, when executed on the base processor in response to spend, save, or give buttons being selected, present on the display the funds in the spend, save, and give accounts, respectively. The base unit includes a housing which presents an appearance of an egg. A website is provided by the computer server and displays information related to the user account to allow a user to deposit funds into the user account, define the allocation schedule, and track charitable acts.

The above provides the reader with a very brief summary of some embodiments described below. Simplifications and omissions are made, and the summary is not intended to limit or define in any way the disclosure. Rather, this brief summary merely introduces the reader to some aspects of some embodiments in preparation for the detailed description that follows.

BRIEF DESCRIPTION OF THE DRAWINGS

Referring to the Drawings

DETAILED DESCRIPTION

Figure 1:
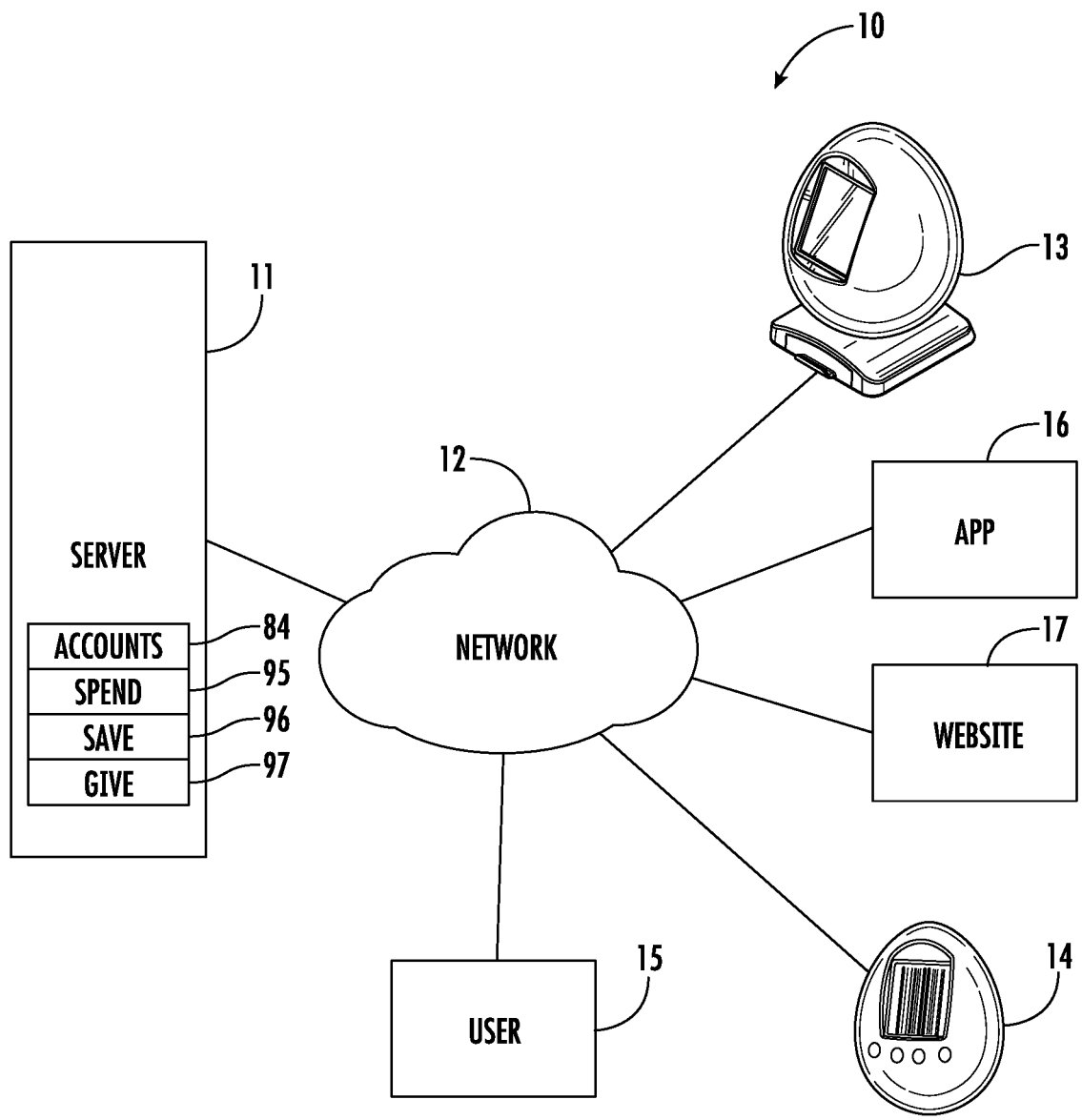
FIG. 1 is a generalized schematic of an improved savings education and money management system.

Reference now is made to the drawings, in which the same reference characters are used throughout the different figures to designate the same elements. Briefly, the embodiments presented herein are preferred exemplary embodiments and are not intended to limit the scope, applicability, or configuration of all possible embodiments, but rather to provide an enabling description for all possible embodiments within the scope and spirit of the specification. Description of these preferred embodiments is generally made with the use of verbs such as "is" and "are" rather than "may," "could," "includes," "comprises," and the like, because the description is made with reference to the drawings presented. One having ordinary skill in the art will understand that changes may be made in the structure, arrangement, number, and function of elements and features without departing from the scope and spirit of the specification. Further, the description may omit certain information which is readily known to one having ordinary skill in the art to prevent crowding the description with detail which is not necessary for enablement. Indeed, the diction used herein is meant to be readable and informational rather than to delineate and limit the specification; therefore, the scope and spirit of the specification should not be limited by the following description and its language choices.

FIG. 1 illustrates an improved savings education and money management system 10 (hereinafter, "system") for children. The system 10 includes both physical and digital components, leverages real, virtual, or imaginary funds, and is suitable for not only tracking finances but also for presenting a visual reminder to attract savings and promote financial education. The simultaneous existence in the physical and digital worlds not only provides a tangibility to younger users necessary to capture their attention and curiosity, but also enables contemporary education about online finances through a digital platform.

The system 10 includes a server 11 hosting and operating the system 10. The server 11 is connected through a network 12 (such as the Internet, local area network, or the like) to a base unit 13 and a mobile unit 14. Users 15 interact with the base unit 13 and mobile unit 14, or through an application ("app") 16 or website 17, to provide and receive information to and from the server 11. Earmarked financial accounts for Spend, Save, and Give allow users 15 to track funds in accounts earmarked for different purposes: Spend is money—real fiat, virtual, or even imaginary money—in an account which the user 15 can spend at her discretion; Save is money in an account which the user 15 is saving for the future; and Give is an account which tracks money and acts which the user 15 has donated to charity or has available to donate to charitable causes.

Both parents and children can be users 15 of the system 10. When parents are users 15, they may deposit and allocate funds into those Spend, Save, and Give accounts. In some embodiments, the funds are imaginary funds, like IOUs, which are merely entries in a transactional ledger which is a convenient way for the parent and child to track funds. In such embodiments, the parent may periodically "settle out" the account in the real world by handing the child physical fiat currency equal to the imaginary funds in the account and then manually "debiting" those imaginary funds from the account. In other embodiments, the account funds represent real money, such as money in a bank savings account or in a financial investment institution. In still other embodiments, the account funds could even represent digital or virtual currency, such as Bitcoin, Ether, and the like, and are linked to blockchain wallets for those virtual currencies.

Figure 2A:
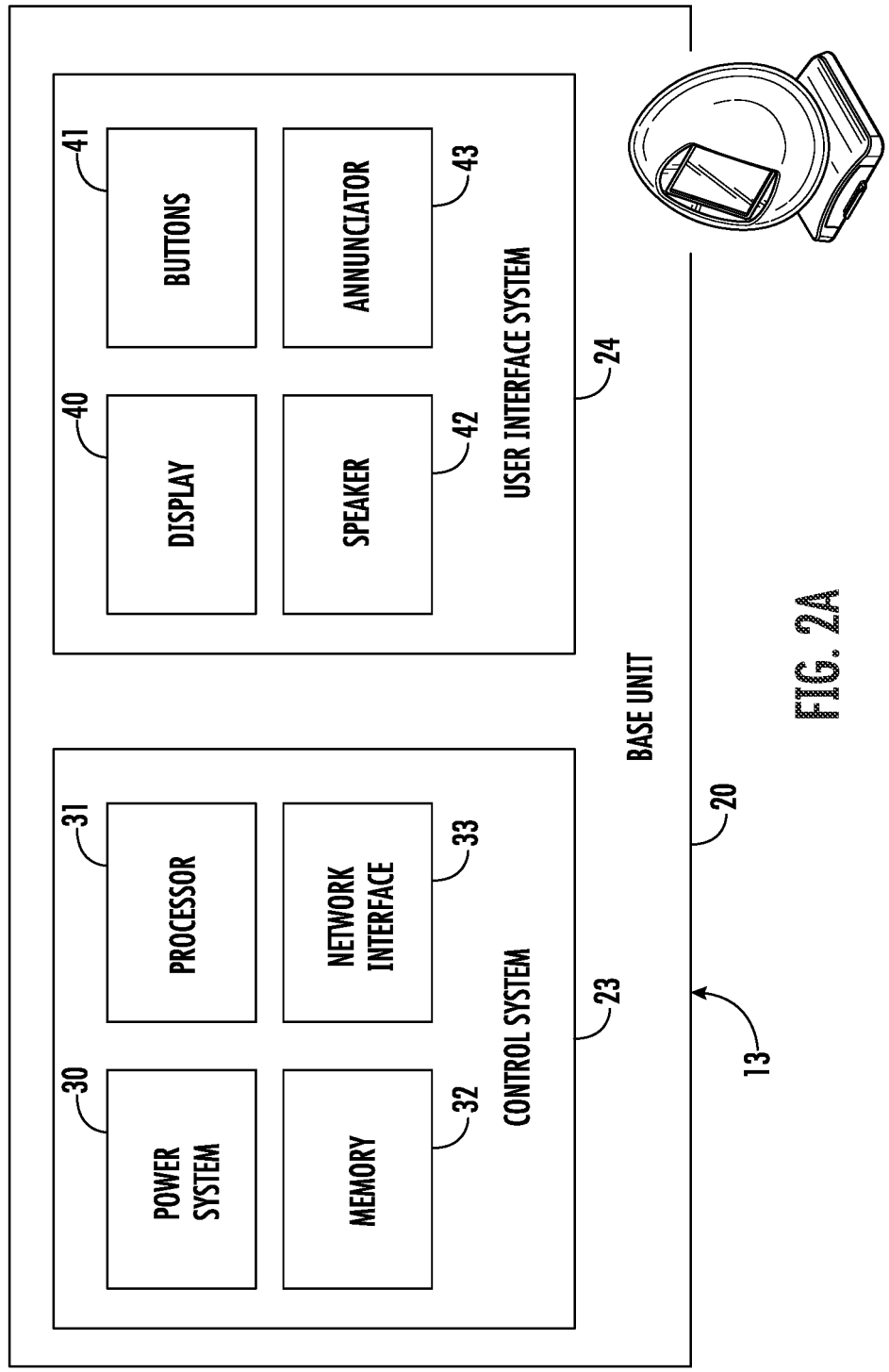
FIG. 2A is a generalized schematic of a base unit of the system of FIG. 1.
Figure 2B:
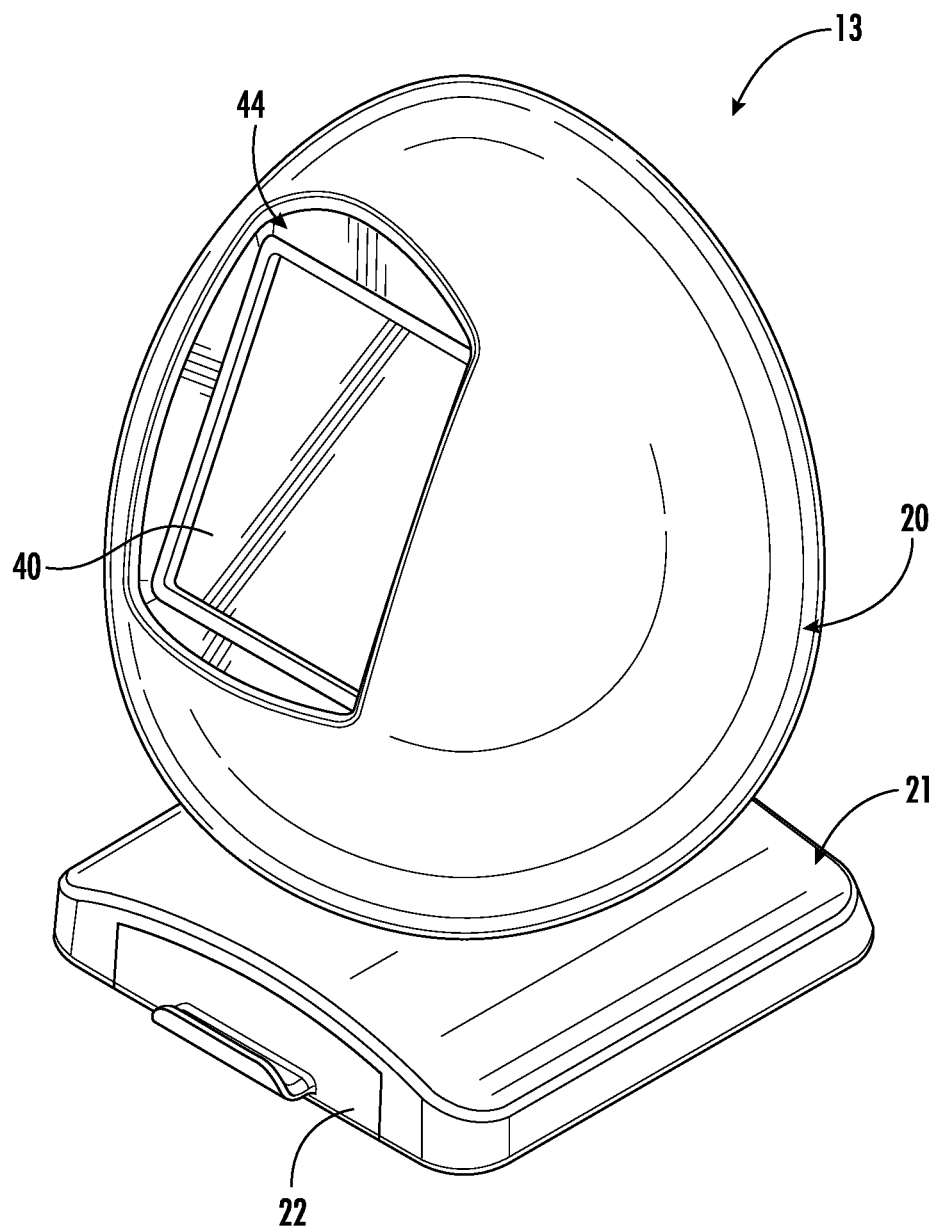
FIGS. 2B and 2C are regular and eroded perspective views, respectively, of the base unit, with a drawer closed and opened.
Figure 2C:
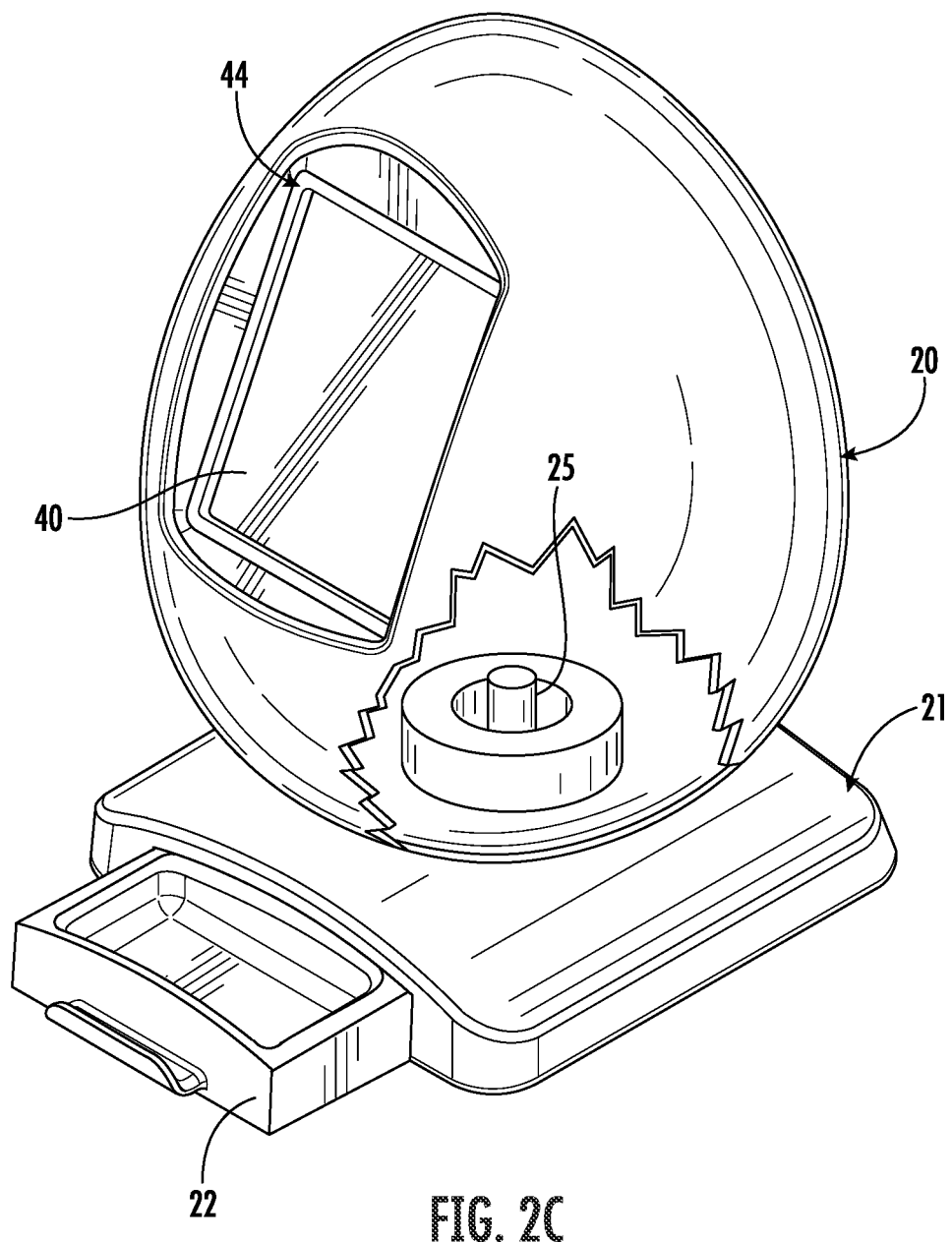

A schematic for the base unit 13 is shown in FIG. 2A, and one exemplary embodiment of the base unit 13 is shown in FIGS. 2B and 2C. The base unit 13 includes a housing 20 containing and enclosing the electronic components of the base unit 13. In the embodiment shown in FIGS. 2B and 2C, the housing 20 presents a generally egg-shaped appearance and includes a stand 21 with a slideable drawer. In other embodiments, the housing 20 has other forms, such as a pig, a dog, a shoe, a four-leaf clover, a computer, or any other desired three-dimensional shape. The disclosure of an egg-shaped housing 20 here is exemplary and not limiting. The egg-shaped upper portion of the housing 20 is mounted for pivotal movement to the stand 21 such that egg-shaped portion can be spun around to orient it in different directions. As shown in FIG. 2C, a post 25 extends upward from the stand 21 through the bottom of the housing 20 in a geometric center thereof; the housing 20 is mounted on this post 25 for movement such that the housing 20 can pivot or spin above the stand 21. The drawer 22 is a small drawer mounted for sliding reciprocal movement into and out of the stand 21, as FIGS. 2B and 2C respectively show. The drawer 22 is sized and shaped to hold small items, such as baby teeth.

The housing 20 contains both a control system 23 and a user interface system 24, through which the user 15 interacts with the system 10. The control system 23 includes a power system 30 to provide power to the base unit 13. In embodiments, the power system 30 includes a chargeable or replaceable battery, while in other embodiments, the power system 30 is a transformer or power input providing wired power from an outlet. The control system 23 further includes a processor 31 for executing instructions programmed into on-board non-transitory memory 32. The memory 32 stores pre-programmed instructions for operating the base unit 13. The memory 32 also at least temporarily stores data and information inputted by the user 15 at the base unit 13, such as button selection instructions. As such, the mobile unit 15 is a specially-built and -programmed hardware component for use within the system 10. The control system 23 also includes a network interface 33, such as a WiFi card, Bluetooth fob, NFC device, ZigBee module, or the like, which connects wirelessly to the network 12 to couple the base unit 13 in data communication with the server 11.

The user interface system 24 includes a display 40. In the embodiment of FIGS. 2B and 2C, the display 40 is mounted in a recessed fashion within a window 44 in the housing 20, below the outer surface of the housing 20. The display 40 is a flat screen, preferably touch-sensitive, which is set into the housing 20 at an incline oriented slightly upward. The display 40 is coupled to the processor 31 and the power system 30 to display data and information to the user 15. The user 15 navigates by interacting with the display 40. In the embodiment shown in FIGS. 2B and 2C, the display 40 is a touch-screen display so that the user 15 can interact with different locations and soft buttons 41 presented temporarily on the display 40. When the user 15 selects a soft button 41, the display 40 detects this input and transmits it to the processor 31 executing the instructions specific for the display 40. Alternatively, some embodiments of the base unit 13 have hard buttons which are connected to provide input to the processor 31. The user 15 uses the buttons 41 to instruct the processor to present information relevant to their account on the display 40. For example, pressing the Spend button directs the mobile unit 13 to query the server 11 for information from the Spend account associated with the user 15. That information is transmitted to the base unit 13, and the processor 31 of the base unit 13 executes code to present the information on the display 40.

The base unit 13 primarily provides information to the user 15 through the display 40. However, in some embodiments, the base unit 13 also includes a speaker 42 and other annunciators 43. The speaker 42 emits music, chimes, alerts, and other sounds in response to certain activities, such as when the user 15 receives a gift, for example. When the server 11 processor detects that funds have deposited in one of the financial accounts for the user 15, instructions on the server in the server 11 memory are executed on the server 11 processor and instruct the base unit 13 to annunciate in a way that corresponds to the time, amount, or account relating to the deposition of funds. The annunciators 43 include alternate speakers, lights, and haptic devices. Like the speaker 42, these annunciators 43 alert in response to events. For example, if a grandparent sends money to the user 15, a light annunciator 43 may glow on and off and emit a chirp periodically. This notifies the user 15 that she has received money, without the need to interact with the display 40. The base unit 13 is, after all, intended to attract and promote financial engagement, and so this passive action by the base unit 13 helps maintain a presence in the life of the user 15.

Figure 3A:
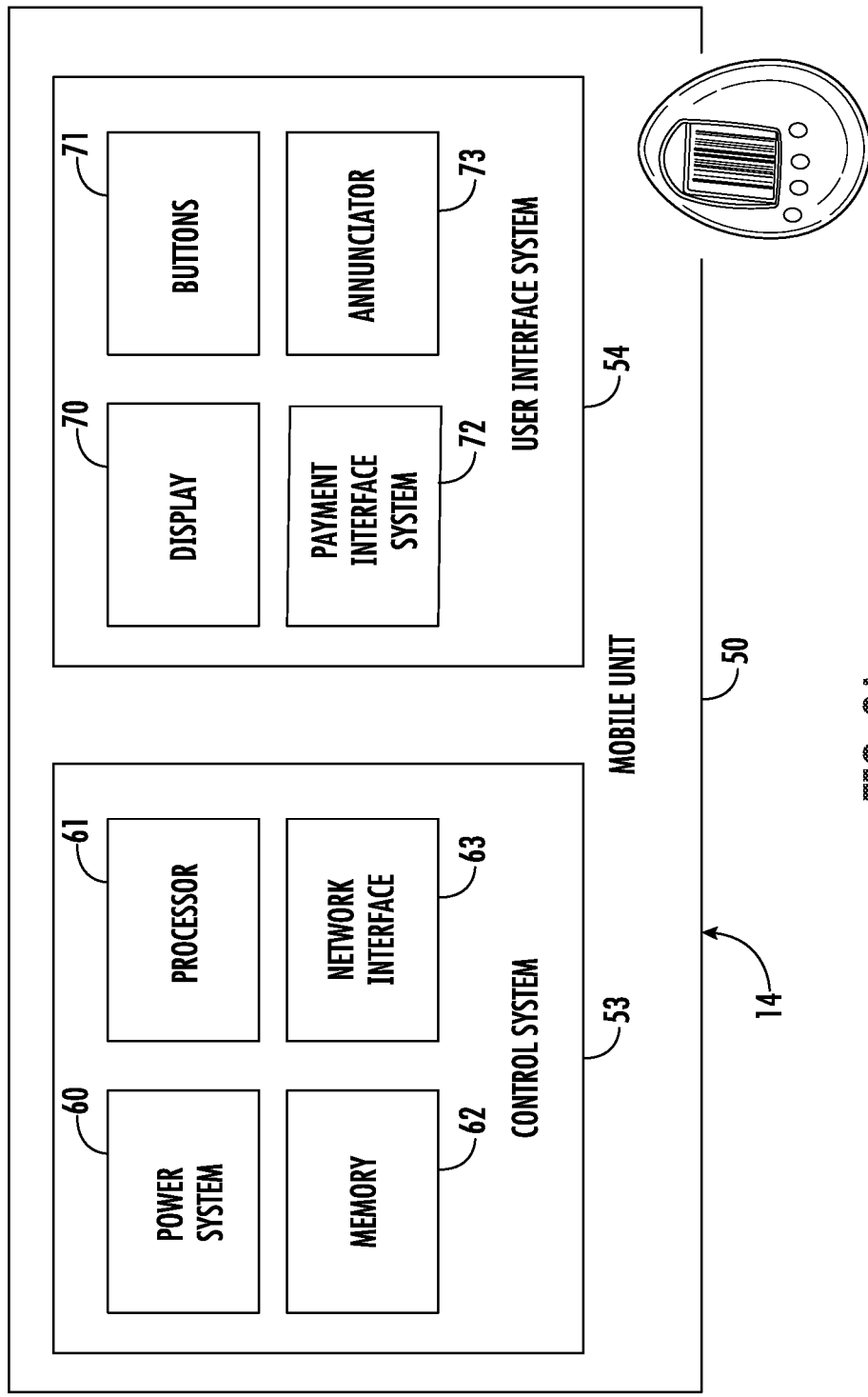
FIG. 3A is a generalized schematic of a mobile unit of the system of FIG. 1.
Figure 3B:
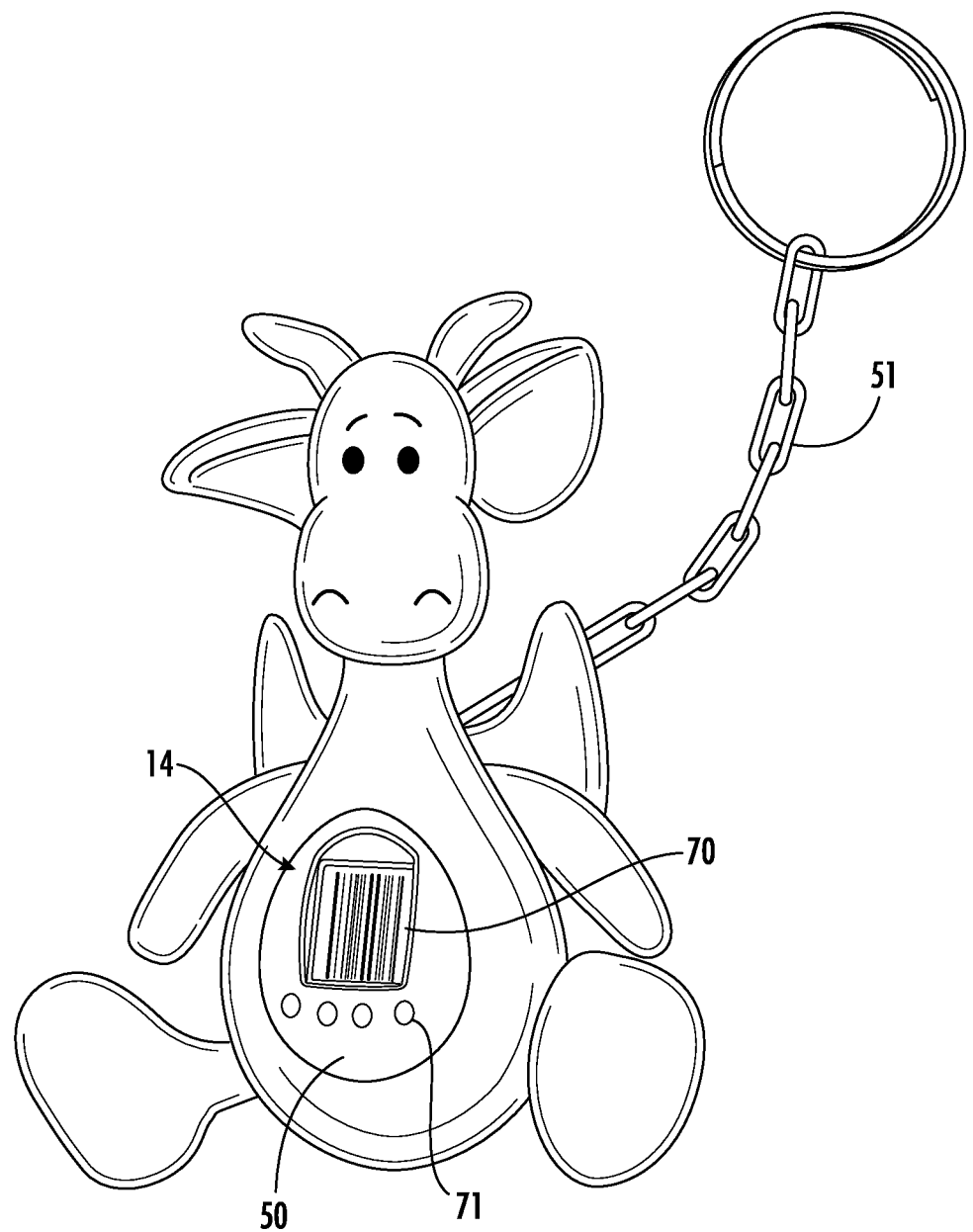
FIGS. 3B and 3C are perspective views of the mobile unit.
Figure 3C:
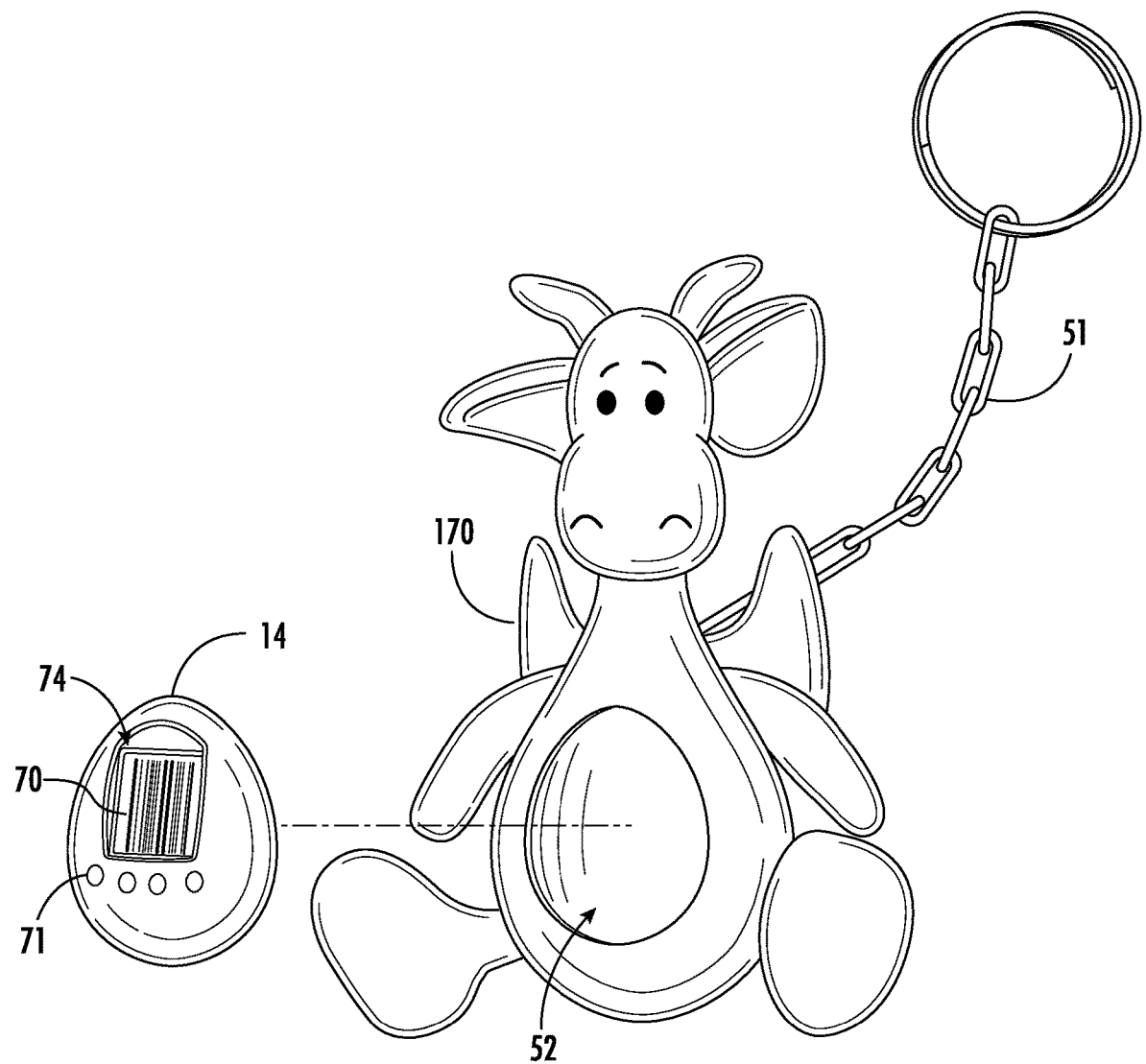

The base unit 13 is preferably the primary device through with the child user 15 accesses the system in her home or bedroom. When the user 15 is out of the home, the mobile unit 14 is useful. A schematic for the mobile unit is shown in FIG. 3A, and one exemplary embodiment of the mobile unit 14 is shown in FIGS. 3B and 3C. The mobile unit 14 includes a housing 50 containing and enclosing the electronic components of the mobile unit 14. In the embodiment shown in FIGS. 3B and 3C, the housing 50 is generally egg-shaped. In other embodiments, the housing 50 is spherical or another shape. The mobile unit 14 may be carried in a plush toy, charm, or like carry-along toy 51, especially one with an internal cavity or hold 52 such as shown in FIGS. 3B and 3C. When the mobile unit 14 is carried within the hold 52 and presented in the circular window of the hold 52, it has the appearance of a yolk.

The housing 50 of the mobile unit 14 contains both a control system 53 and a user interface system 54, through which the user 15 interacts with and uses the mobile unit 14. The control system 53 includes a power system 60 to provide power to the mobile unit 14. The power system 60 is preferably a chargeable or replaceable battery. The control system 53 further includes a processor 61 for executing instructions programmed into on-board non-transitory memory 63. The memory 63 stores pre-programmed instructions for operating the mobile unit 14 and also temporarily stores data and information inputted by the user 15 at the mobile unit 14. As such, the mobile unit is a specially-built and -programmed hardware component for use within the system 10. The control system 53 also includes a network interface 33, such as a WiFi card, Bluetooth fob, NFC device, ZigBee module, or the like, which connects wirelessly to the network 12 to couple the mobile unit 14 in data communication with the server 11. The mobile unit 14 preferably connects to the network 12 through a nearby mobile phone, tablet, or like connected device, but can also connect directly to the network 12.

The user interface system 54 includes a display 70. In the embodiment of FIGS. 3B and 3C, the display 70 is mounted in a recessed fashion within a window 74. The display 70 is a flat screen which is set into the housing 20 at an incline oriented slightly upward. The display 70 is coupled to the processor 61 and the power system 60 to display data and information to the user 15. Preferably, the user 15 navigates by interacting with buttons 71. The buttons 71 are shown in the embodiment in FIGS. 3B and 3C just below the display 70. In other embodiments, the mobile unit 14 includes no hard buttons 71 but employs soft buttons which are presented directly on the display 70, which is touch-sensitive. The user 15 uses the buttons 71 to instruct the processor to present information relevant to their account on the display 70.

The mobile unit 14 may also be provided with a payment interface system 72 to allow mobile unit 14 to interface with digital currency payment devices (not shown) to allow the user 15 to complete a transaction. For example, the payment interface system 72 may include pre-programmed unique user identification and credit card or digital currency information, which can be displayed on the display 70 in the form of a bar code (as shown in FIGS. 2B and 2C), QR Code, or other encoded machine-readable data.

The mobile unit 14 primarily provides information through the display 70, allowing the mobile unit 14 to be used as a form of payment like a debit or credit card. However, in some embodiments, the mobile unit 14 also includes annunciators 73, such as speakers, lights, and haptic devices. These annunciators 73 alert in response to events. For example, if a grandparent sends money to the user 15, a light annunciator 73 may glow on and off and emit a chirp periodically. This notifies the user 15 that she has received money, without the need to interact with the display 70. Alternatively, when the user 15 scans the payment code on the display 70 to purchase an item at a retail location, the mobile unit may vibrate and emit a cash register sound.

The mobile unit 14 is usable as a form of payment. It can interface with a payment device, either by providing the scannable code on the display 70 or through wireless communication such as NFC protocol. When used as a form of payment, charges incurred with the mobile unit 14 debit the Spend account associated with the user 15 account. When the code on the display 70 is scanned, the scanning device decrypts and reads the code as payment information corresponding to the user 15 and a financial account. The scanning device communicates through its merchant network. In some embodiments, such as those in which the mobile unit 14 is directly connected to a debit or even a credit account, the merchant network will debit the financial account. In other embodiments, such as those in which the Spend account tracks imaginary currency rather than real currency, instructions in the mobile unit instruct the mobile unit 13 to transmit an instruction to the server 11 to debit the Spend account. In some embodiments, the mobile unit 14 is password-protected.

Both the base unit 13 and the mobile unit 14 are coupled through the network 12 to the server 11, which is part of and hosts the system 10. The server 11 is a specially-programmed computer or plurality of computers having at least a processor or central processing unit ("CPU"), non-transitory memory such as random access memory ("RAM") and mechanical or solid-state hard drive memory, hardware such as a network interface card and other cards connected to input and output ports, and software specially-programmed to host the system 10 and process and respond to requests from users. The server 11 hosts the app 16 and the website 17, transmitting a regarding both to users when requested. The server 11 also communicates with the base and mobile units 13 and 14 to receive and deliver information from those units 13 and 14.

The server 11 maintains a database of accounts. Each account corresponds to a user 15 or child. Each account is defined by and includes data storage of user name, password, biographical information, as well as ledgers. The ledgers track different types of financial accounts, including saving accounts, spending accounts, and donation accounts. Each user 15 account further includes storage for kindness or community service activities. In some embodiments, the user 15 account is linked to a real financial institution, such as a bank or an investment account.

In addition to using the base and mobile units 13 and 14, the user 15 can access the system 10 through the app 16 and the website 17. The app 16 and website 17 are substantially similar to each other, delivering similar information through a similar architecture, but doing so through different platforms. Preferably, the server 11 delivers the app 16 through a mobile device, such as an Internet-capable phone, tablet, or like device, while the server 11 delivers the website 17 on a desktop computer, laptop computer, or the like. Because the app 16 and website 17 are similar, only the website 17 described below, with the understanding that the ensuing description applies equally to both the app 16 and the website 17 unless otherwise noted.

Figure 4A:
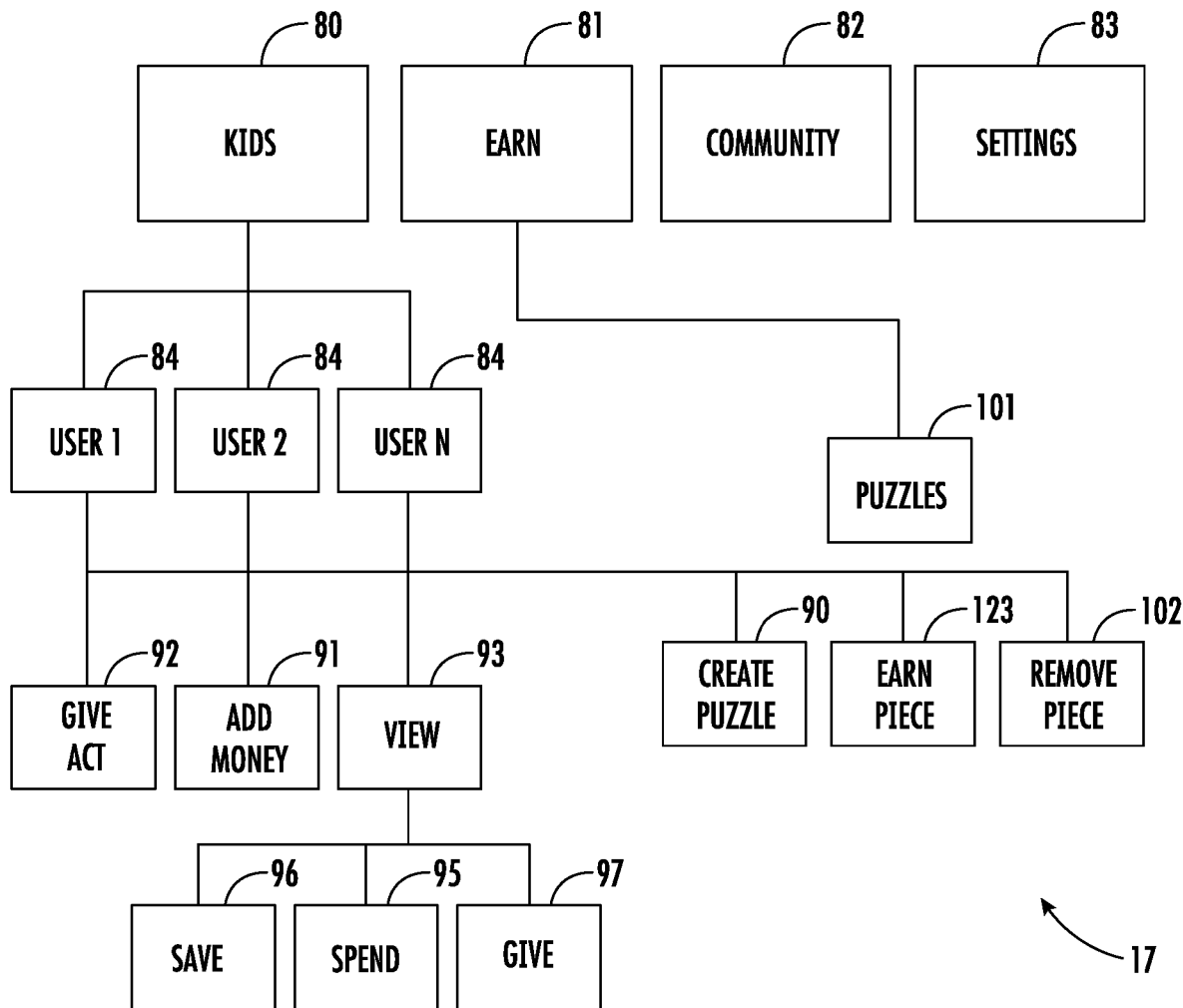
FIG. 4A is a generalized architectural schematic of a website of the system of FIG. 1.
Figure 4B:
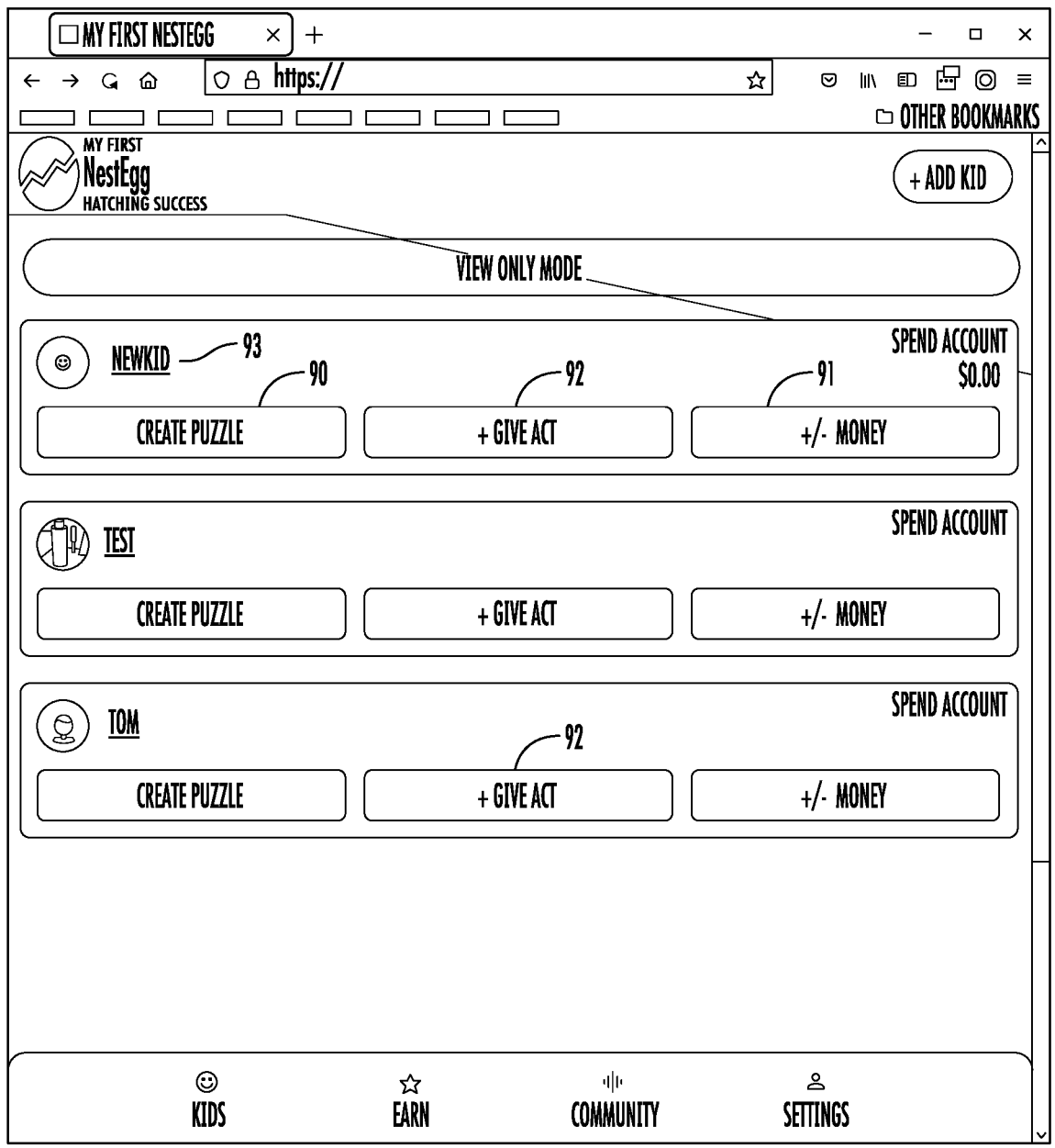
FIGS. 4B-4G illustrate embodiments of pages of the website.

FIG. 4A shows a generalized architectural schematic of the website 17, with each box shown on the drawing illustrating a separate webpage of the website 17 or feature within a webpage. A home or welcome page for the website 17 illustrates links to four main pages: kids 80, earn 81, community 82, and settings 83. FIG. 4B illustrates an embodiment of the home page. Clicking on the links for any of the four pages transmits a request to the server 11 to deliver data for the corresponding page to the device of the user 15 for display on the device screen. Each page, and each subpage, displays these links for the kids 80, earn 81, community 82, and settings 83 pages, preferably along the bottom or top of the webpage.

The settings 83 page allows the user 15 to set and modify information and preferences about the user account on the server 11. For instance, the user 15 can update profile information such as name, age, email, password. The user 15 can also see a history of transactions, add and withdrawn money, acts, community service, donations, etc. The settings 83 page includes functionality to connect a base unit 13 or mobile unit 14 to the account of the user 15, so that information within the user 15 account may be displayed on the base unit 13 or mobile unit 14. The settings 83 page further includes information about the system 10, technical support, and feedback. The settings 83 page is not illustrated in the drawings as these functions will be understood by one having ordinary skill in the art.

Selecting the community 82 page displays aggregate totals of acts and achievements by all users. The community 82 page also includes leaderboards which list the users who have completed the most achievement, acts of kindness, or savings. The community 82 page gamifies the system 10 to incentivize the child to do, learn, save, and help more.

Selecting the kids 80 page takes the user back to the home page. Initially, no accounts are shown, but an "Add Kid" button allows a child to be added. Selecting that button prompts the user 15 to add a name and age of a child, as well as a photograph is desired. Once added, the child appears on the kids 80 page.

Referring to FIG. 4A, an adult can set up a plurality of children or users 15. The user boxes 84 are labeled "User 1," "User 2," and "User N" because there is no restriction on the number of child accounts that may be created. The user boxes 84 correspond to user accounts for each child user 15, which maintain the name and age of the child user 15, as well as the financial and puzzle information created in the system 10 for the child user 15.

Figure 4C:
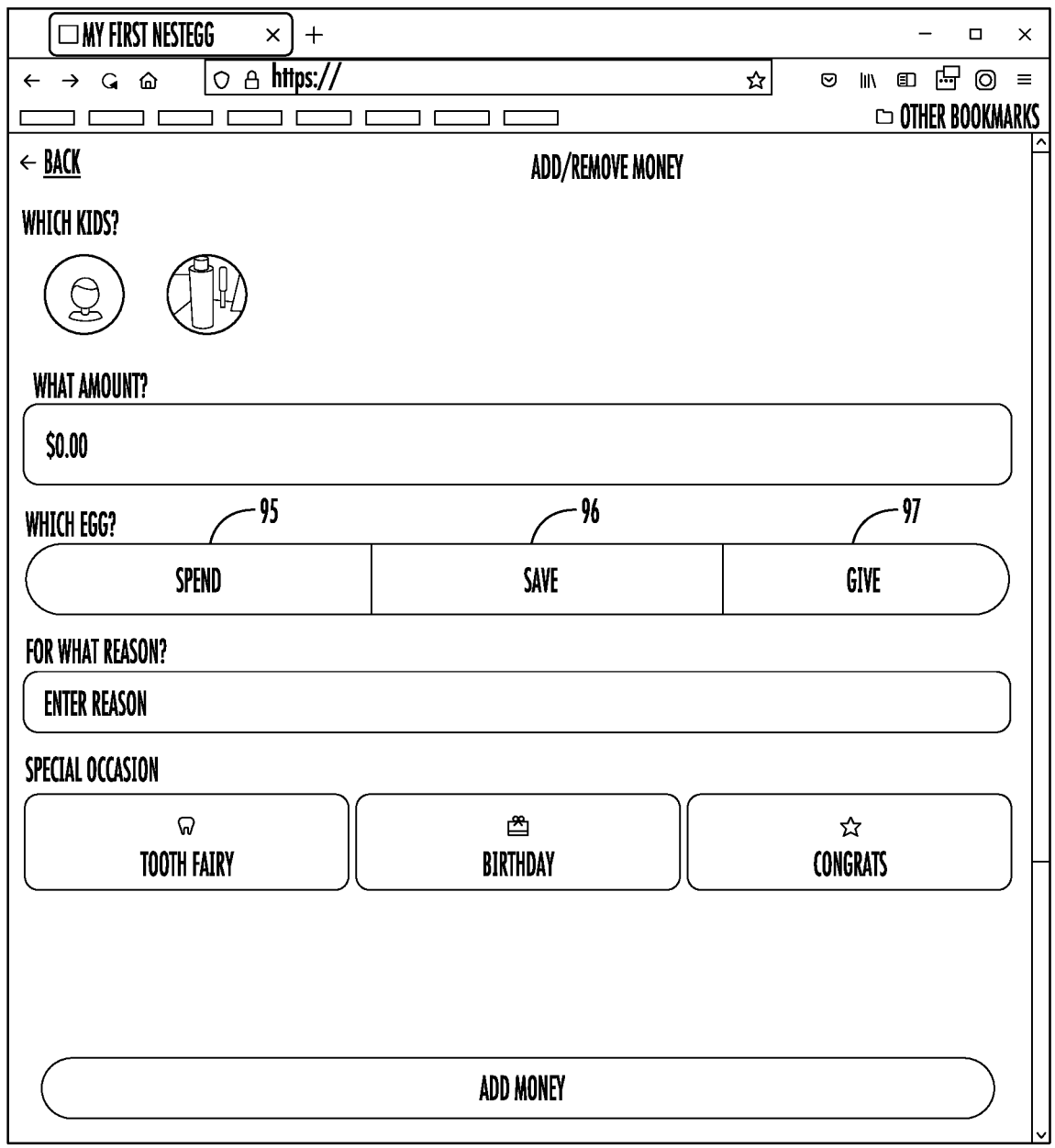

When a new user 15 is created with the "Add Kid" button, that user 15 appears on the child 80 page. The system 10 provides certain functionality to a new user 15. As shown in FIG. 4B, the user can create a puzzle 90 or add and withdraw money 91. Selecting the create a puzzle 90 link directs the user to a page on which a puzzle can be created. Selecting the add/withdraw money 91 link directs the user to a page on which money can be added or removed from different Spend, Save, and Give accounts 95, 96, and 97 (an embodiment of the page is shown in FIG. 4C). That page can also be accessed through buttons 105 at the top of some screens (such as in FIG. 4F); those buttons allow a user 15 to add or withdraw funds from accounts and to transfer funds among the accounts. Existing users can also earn a piece to the puzzle according to a process described below, and can give an act 92 of kindness or community service.

Figure 4D:
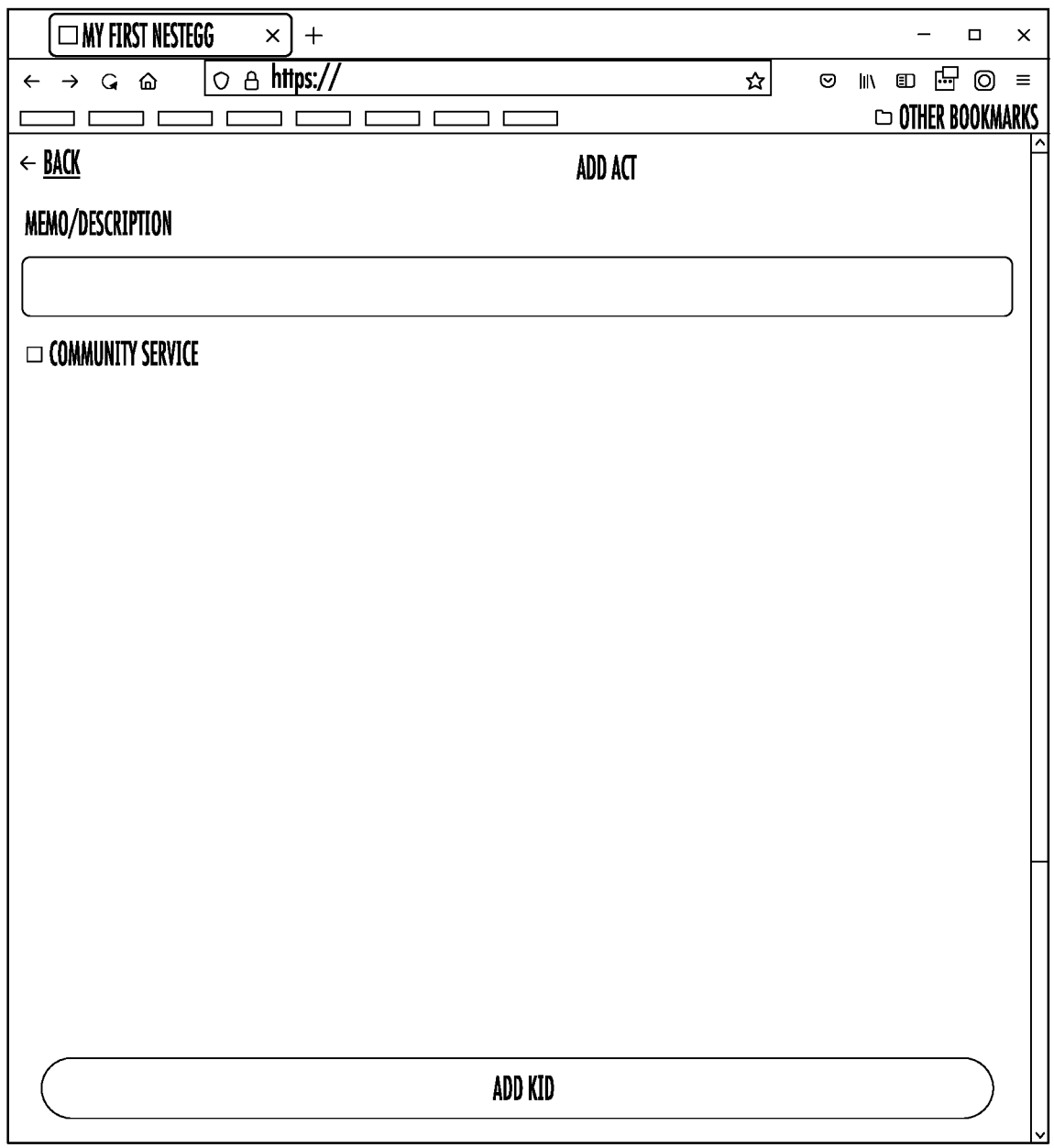

Selecting the give act 92 link directs the user 15 to a page at which the user 15 can enter information about an act that has been performed. FIG. 4D shows an embodiment of that page. The user writes a description of the kind act or chore that was performed and saves it, thereby recording it under a charitable acts account for the user 15 within the server 11. The kind act, along with other kind acts, is later accessible under the account history on the settings 83 page. The charitable act account, unlike the financial accounts of Spend 95, Save 96, and Give 97, does not track money; it instead tracks acts, descriptions, evidence, and like information related to charitable activity.

Figure 4E:
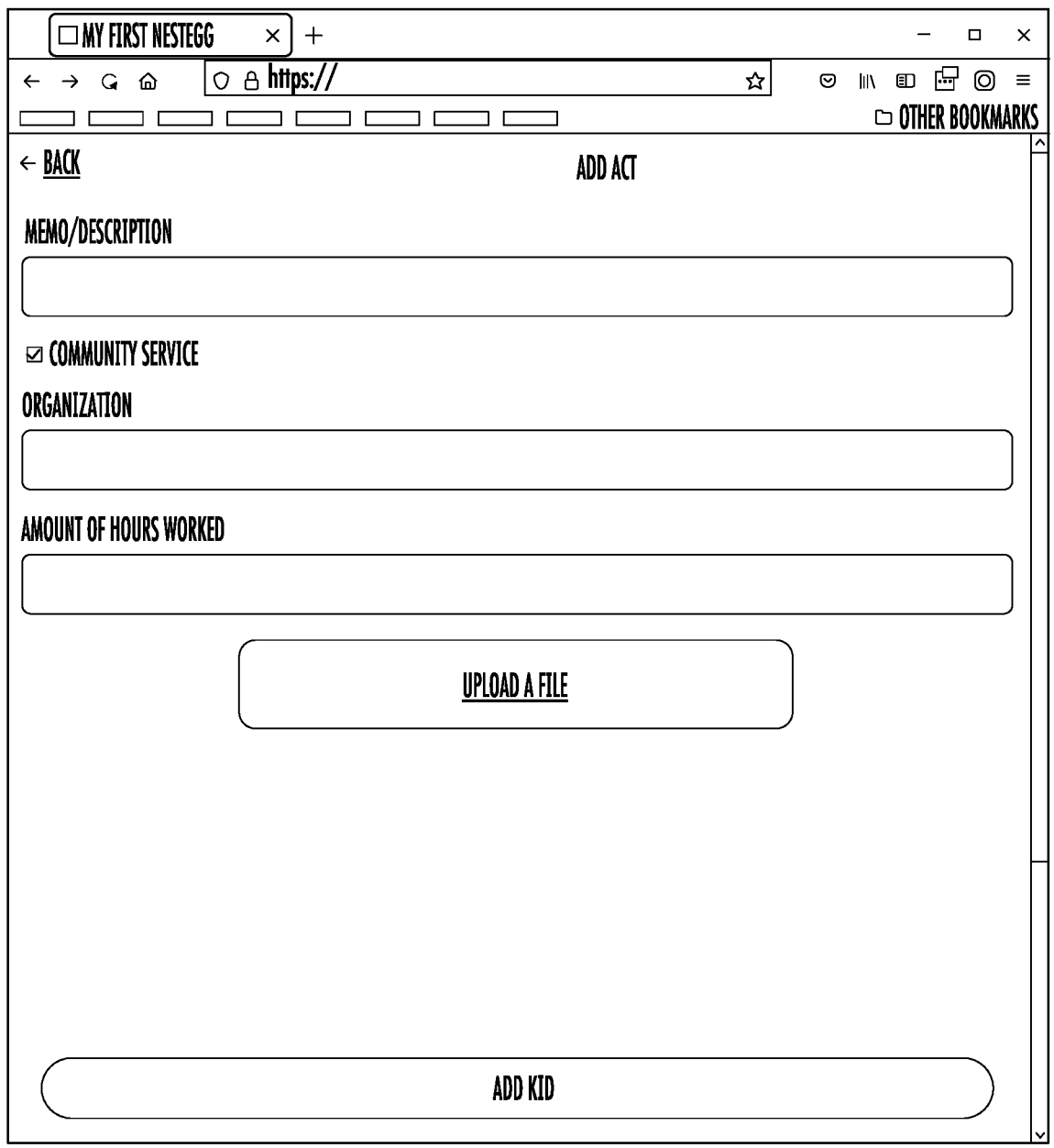

That page also allows the user to enter a community service act, as shown in the embodiment shown in FIG. 4E. There, the user writes a description of a kind act that was performed with an organization. The user also records the organization name and the amount of time worked. The system 10 provides an uploaded feature such that the user can upload written proof or other documentation of the community service activity. Each of the fields is stored in the account for the user 15. Correspondingly, the user 15 is able to not only track community service performed over a long period of time, but can also memorialize evidence of that service with original records. Community service acts are later accessible under the account history on the settings 83 page. When a user applies for college or submits a job application, she has a verifiable record of charitable acts.

Figure 4F:
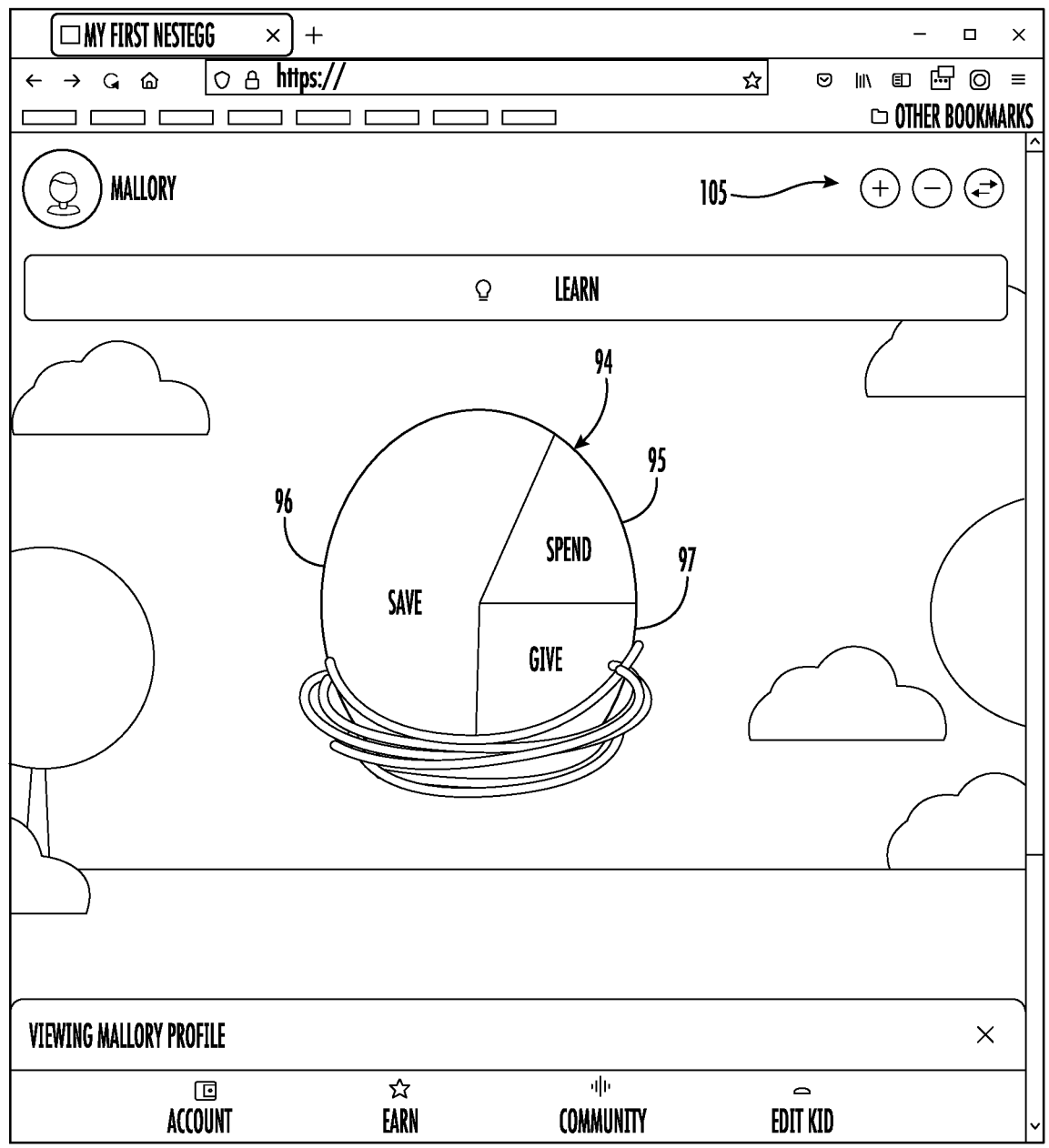

Returning to the embodiment shown in FIG. 4A, the user 15 can also view 93 information about her account. Selecting the view 93 option directs the user to a page displaying information about the account. One embodiment of that page is shown in FIG. 4F, which displays an egg 94. The egg 94 is divided into three sections: one for Spend 95; one for Save 96; and one for Give 97. Each of these sections is a link and is associated with a financial account or a ledger for the user 15.

Figure 4G:
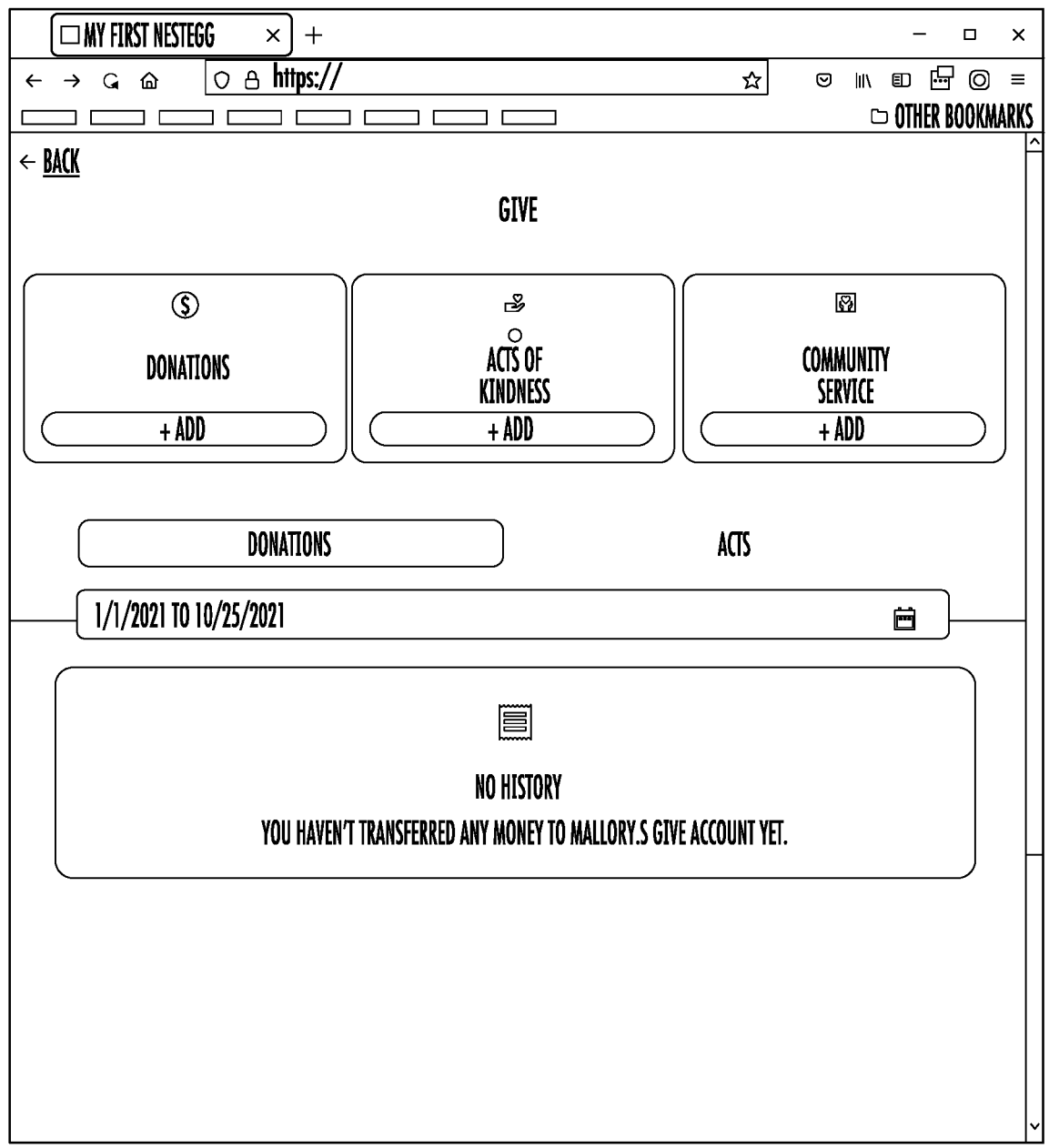

Selecting the "Give" link directs the user 15 to a page showing her charitable acts and contributions, an embodiment of which is shown in FIG. 4G. This page separately lists donations, acts of kindness, and community service acts. Acts that have been added to the user's account according to the description in the paragraphs above are viewable here as either acts of kindness or community service, depending on how they were characterized when entered. Additionally, the user's donation funds are shown. Funds that have been donated by the user 15 are viewable here, and funds that are earmarked for use by the user 15 when donating to a charity are also shown in this Give account 97. In some embodiments, the view settings for the Give account 97 include a toggle to display only the funds to donate, or only the funds already donated, or both. The user 15, the parent of the user 15, another relative, or friend deposits funds to the Give account 97 for the user 15 to donate or use charitably. Through the Give account 97, the user, or the parent of the user, tracks the total amount of charitable donations made by the user. Selecting the "+Add" button further allows the user to add additional funds to Donations. When added, this increments the total amount of funds available for charitable donation and becomes visible on the page embodiment shown in FIG. 4G. The user 15 can also select the "+Add" buttons under Acts of Kindness and Community Service to access the page embodiments of FIGS. 4D and 4E, respectively.

Selecting the "Spend" link directs the user 15 to a page which shows her how much money she has available to spend on desired purchases from the Spend account 95. Money is earmarked in the Spend ledger when it is added to the user 15 account. The user 15, the parent of the user 15, another relative, or friend deposits funds to the Spend account 95 for the user 15 to spend. In some embodiments, with approved vendor websites, parents can add items to a child's approved wish list so that the child can buy those items from her own page when the child reaches the corresponding amount of money in her Spend account. Parents can elect the system 10 to provide alerts when a child nears the goal to buy the desired item. Alternatively, a child can work toward a goal item with a puzzle, as described below.

Selecting the "Save" link directs the user 15 to a page which shows her how much money she has saved and is available in the Save account 96. This information is shown in the aggregate and also is shown for a set of earmarked goals, such as a car, education, or discretionary spending.

The user 15 determines an allocation schedule for deposits and thus decide how funds added to her user account will be distributed among the sub-accounts under Save, such as savings accounts, 529 accounts, or other accounts. Preferably, the parent can set this allocation schedule, but in other embodiments, the child may set it.

Indeed, when parents, guardians, or the users themselves initially set up a user 15 account, they will be able to provide instructions on a desired allocation schedule of funds among the various digital accounts, either at a high level among the Spend, Save, and Give accounts 95, 96, and 97, or within the more narrowly-defined accounts within the Save account 96.

Figure 5:
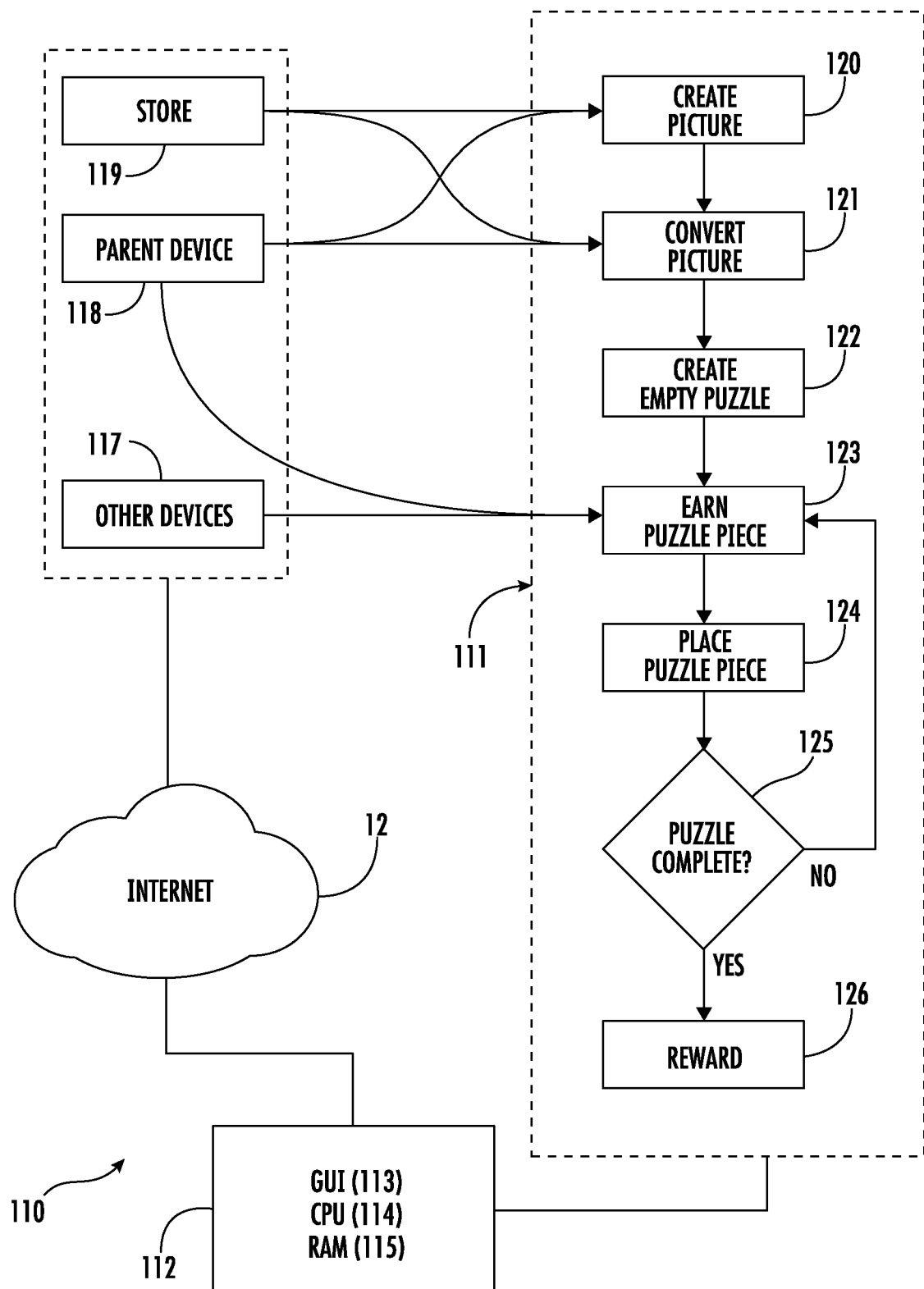
FIG. 5 is a flow diagram and schematic illustration of a puzzle generation and solution system and process.

Because children respond well to instant gratification, the system 10 uses gamification to incorporate a puzzle generation and solution system and process 110, schematically shown in FIG. 5. Generally, and without defining or limiting the process 110, the puzzle gamification process 110 involves creating a picture of a desired object or goal, converting that picture into a puzzle, assembling the puzzle through the completion of actions or savings events, and then redeeming a reward upon completion of the entire puzzle. In some embodiments, the process 110 is a dedicated software application operating on a desktop or laptop computer or on a mobile device such as a smart phone or tablet. In other embodiments, the process 110 operates as one aspect of software executing on a dedicated, special-purpose hardware unit, such as the base unit 13 or the mobile unit 14.

In FIG. 5, the process 110 is shown as running nearly entirely within an application 111, shown in broken line surrounding most of the operational steps of the process 110. The application 111, as mentioned above, may be a dedicated software application on a desktop or mobile device or may be part of software installed on computer or a special-purpose hardware unit. Preferably, the application 111 is part of the app 16 or website 17. For example, the user 15 accesses the puzzle process 110 through the earn 81 page on the website 17, or may alternately access it through a kid 80 page, or may alternately access it through a puzzle page 101 as shown in FIG. 4A. Regardless of the manner in which the process 110 is accessed, the application 111 is run on a hardware device 112 having at least a graphical user interface ("GUI") 113, programmable logic 114, and non-transitory writeable memory 115. In some embodiments, that hardware device 112 is a computer, phone, the base unit 13, or the mobile unit 14. New reference characters are used here to separately distinguish the various structural components and features from those of the base unit 13 and mobile unit 14 for clarity only.

The GUI 113 is preferably a touch-screen interface but in other embodiments may also be a non-touch screen display. The GUI 113 is coupled in data communication to the programmable logic 114 (preferably but not necessarily through a video card or video processor), and the programmable logic 114 is coupled in data communication to read and write data to the memory 115. The hardware device 112 is connected to the network 12 (which may be the Internet), and through the network 12 to a plurality of other networked devices, as is be explained below.

So that it may communicate with the server 11, the accounts 84 thereon, and the base unit 13 and mobile unit 14, the hardware device 112 is connected through its network interface to the network 12. Other devices 117, such as the base unit 13 and the mobile unit 14, and preferably also a parent device 118, are also connected to the network 12. Thus, all of these devices are connected in data communication through the network 12. The parent device 118 is preferably operated by the parent for the benefit of the child.

The parent device 118 may be installed with the app 16, with the application 111 (which may be the app 16), or with a companion application to either. Because the parent device 118 is connected to the network 12, the application running on the parent device 118 is connected to the server 11. The parent may thus use the parent device 18 to access the server 11, the app 16, and the website 17.

Figure 6A:
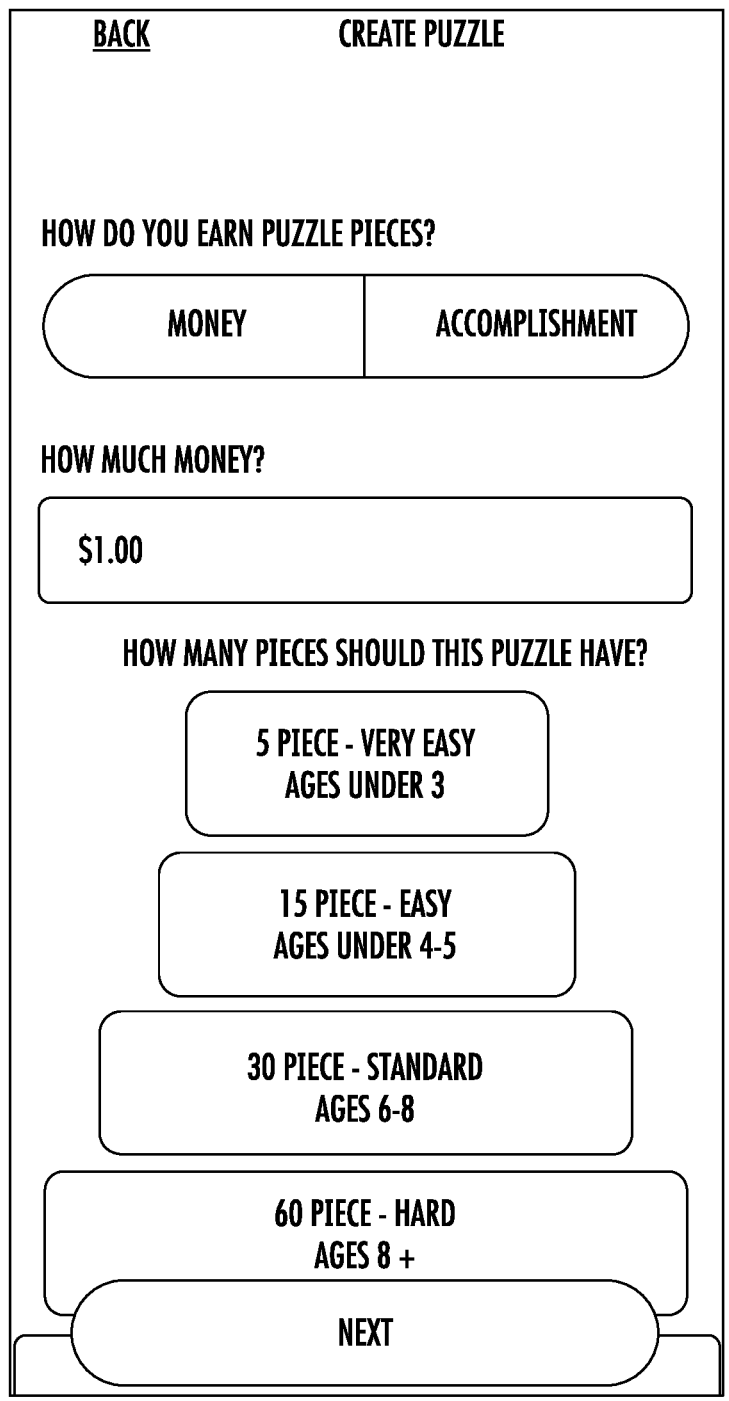
FIGS. 6A-6C illustrate embodiments of an application displaying steps of the puzzle generation and solution system and process.
Figure 6B:
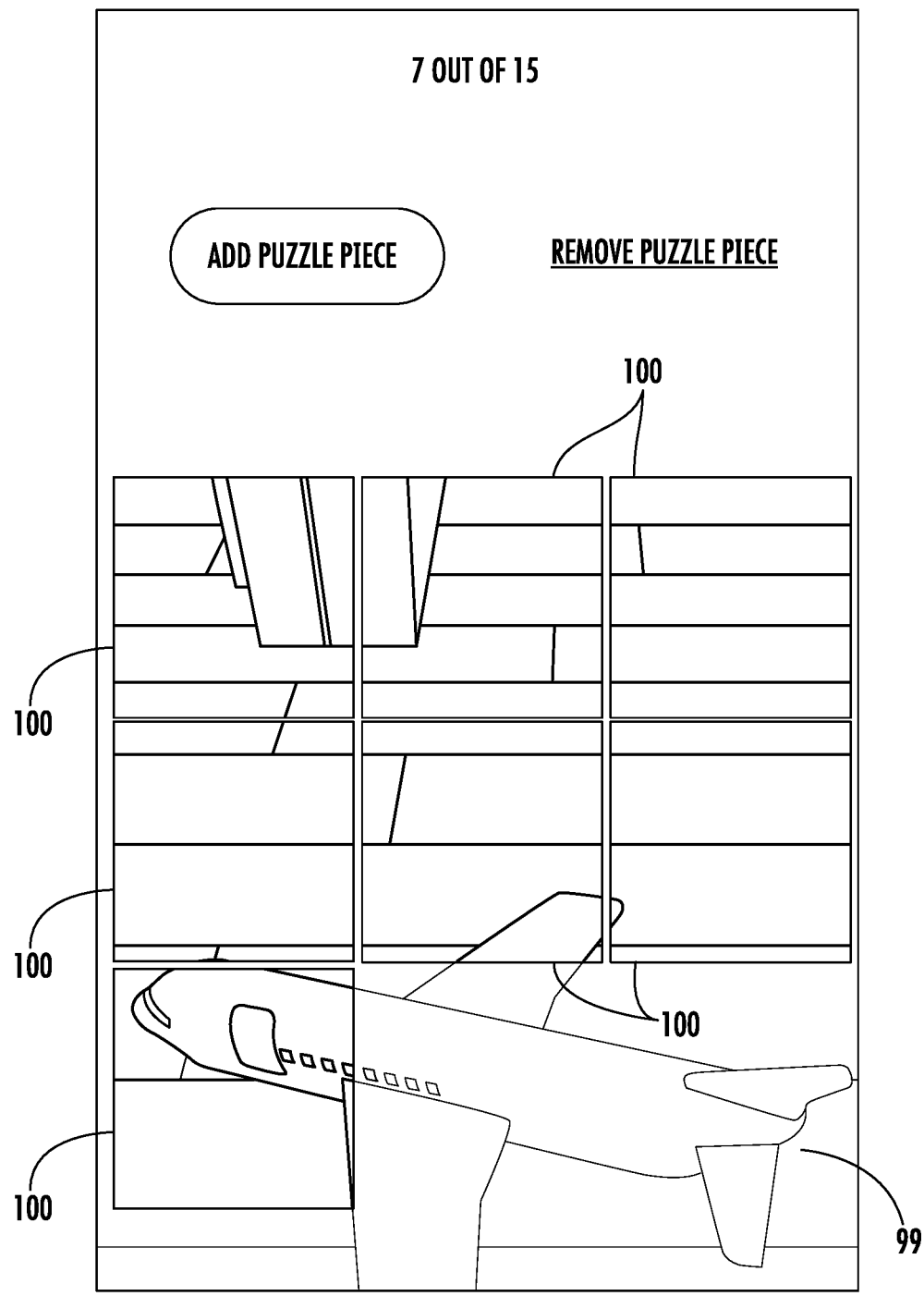
Figure 6C:
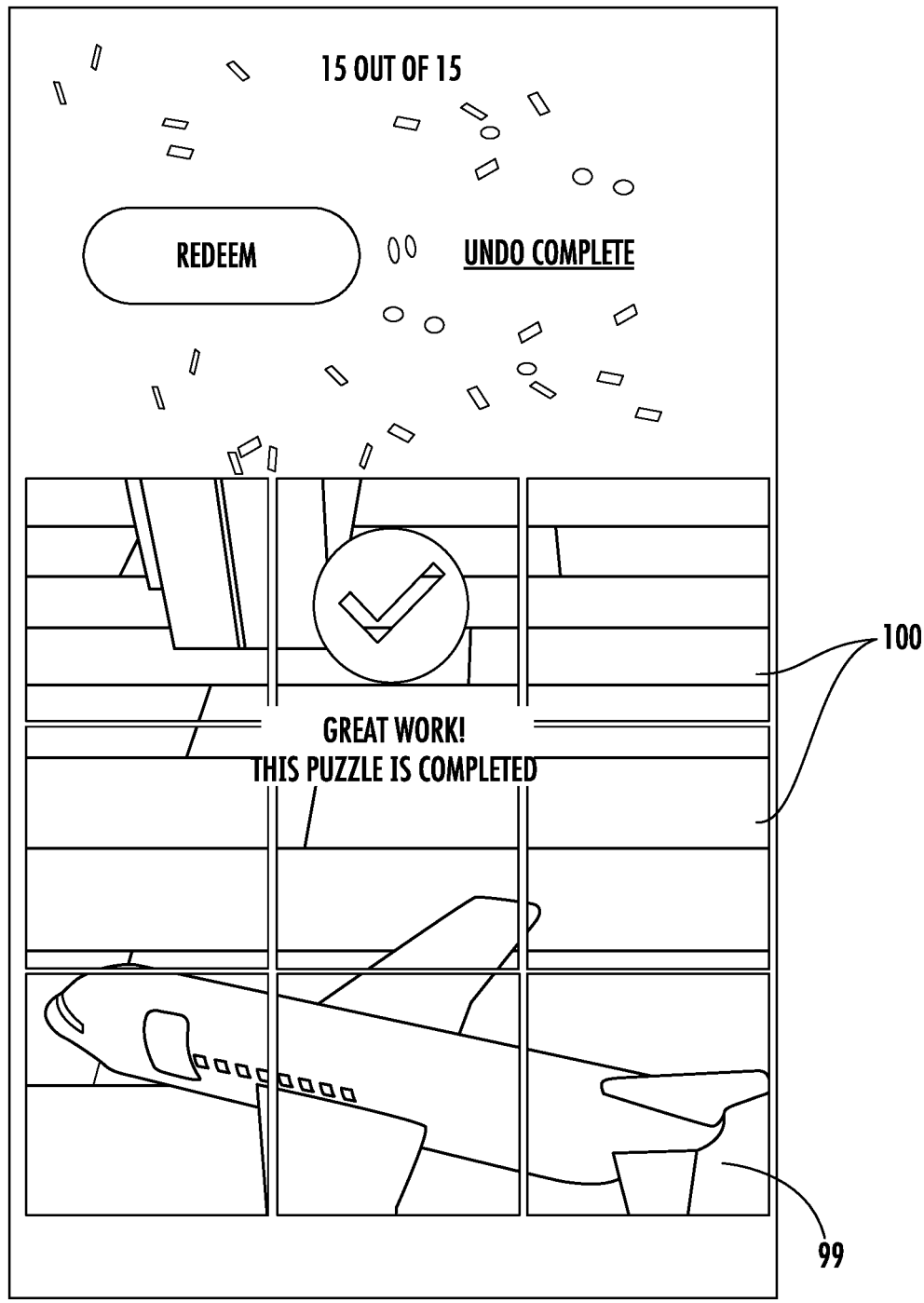

Referring now still to FIG. 5 but also to FIGS. 6A through 6C, the process 110 begins when a picture is created, in step 120. The picture preferably depicts the child's goal. For example, the picture may be a photograph of a toy plane that the child wants to buy. In some embodiments, a parent creates the picture by taking a photograph of a toy plane on the parent device 118. In other embodiments, the parent chooses the picture by taking a screenshot of a toy plane on a website. In yet other embodiments, a picture may be drawn by the child to give the child a greater sense of investment and ownership in the learning process. In still other embodiments, the parent or child finds an online store 119 selling a toy plane, and the server 11 connects to and communicates with the online listing to import the picture therefrom. The picture is a depiction of the child's goal and becomes a representation for the child's progress toward that goal, thereby allowing the child to visualize and track her progress in achieving the goal. The goal need not always be a tangible product like a toy plane; it could also be an event, like a trip to a movie theater or an ice cream outing. The goal could also be an accomplishment, such as cleaning one's room or completing college applications, in which case the puzzle serves less as a reward tool and more as a tracking tool as the child makes small accomplishments (cleaning toys off the floor, putting clothes away, organizing a bookshelf, etc. or completing an entrance exam, filling in biographical information, writing an essay, mailing the application, etc.) toward the larger goal.

When the parent creates or selects the picture, and since the parent's companion app or the application 111 is connected to server 11, the parent can upload the picture directly to the server 11 and associate it with the child's user 15 account on the server 11. When the parent or child finds the picture on an online store listing, a plugin on the application 111, an application on the parent's phone, an API communication, or the like connects and uploads the picture to the server 11.

Next, the picture is converted to a puzzle, at step 121. In this step, the picture is broken into a selected number of puzzle pieces. The selected number of puzzle pieces is chosen in one of several manners. In one manner, the parent inputs the dollar cost of the object depicted in the picture and that dollar cost determines the selected number. For example, the parent types into the application 111 that the toy plane has a cost of one hundred fifty dollars, the application 111 assigns one hundred fifty to the selected number, and the picture is broken into one hundred fifty puzzle pieces. In another manner, the store 119 has a listed dollar cost for the object, and the application 111 assigns that listed dollar cost to the selected number. There are other manners of setting the selected number of puzzle pieces, not based on money. In one manner, the parent simply chooses the selected number, based on whatever criteria the parent chooses. In another manner, the parent chooses the selected number and expects the child to complete a corresponding number of activities, such as chores, music lessons, successful potty training events, etc. There are a variety of ways to set the selected number of puzzle pieces, and the above list is exemplary only and non-limiting. FIG. 6A shows an embodiment of the application 111 and a screen showing the creation of the puzzle 99, and FIGS. 6B and 6C show the puzzle. In that embodiment, the puzzle 99 uses a picture of a toy plane to incentivize working toward earning that new toy; nine puzzle pieces 100 are to be laid upon the puzzle 99 to complete it.

In step 122, an empty puzzle is set. Here, the GUI 113 displays an empty puzzle. No pieces are filled into the empty puzzle. In some embodiments, the empty puzzle simply displays the picture of the object, shown greyed-out or with high transparency in the background. In some embodiments, the GUI may show an outline circumscribing the puzzle, as is common in some puzzles for very young children. However, in most embodiments, the empty puzzle will simply show a large blank space on which puzzle pieces will be placed later. In some embodiments, to the side of that blank space, unearned puzzle pieces may be shown in a jumble.

The next steps 123 and 124 involve filling in or solving the puzzle. In step 123, a puzzle piece 100 is earned. A child earns a puzzle piece 100 when they complete a task or activity, such as performing a chore, practicing a music lesson, using the potty, saving a dollar, having a dollar gifted to them by a friend of family member, etc. Earning puzzle pieces incentivizes certain behaviors. In some cases, a parent may also decide it is necessary to remove a piece 100 to discourage some behavior; a remove piece 102 option (FIG. 4A) is available for that situation.

The application 111 is instructed that a puzzle piece 100 has been earned in several potential ways. In one way, the parent informs the application 111, such as by logging on to the companion app on the parent device 118, or by logging on to the website 17, or by pressing a button or navigating soft buttons on the GUI 113 of the device 112 itself. In another way, the application 111 receives this information automatically through its networked devices. For example, if the server 11 is connected to a savings account for the child, and a deposit from the child's grandparents is made into the account, that deposit triggers the earning of a puzzle piece 100. The parent is able to set a scale-down or scale-up ratio on such deposits, so that, for example, if a grandparent gifts $100 to the child, the gift scales to only ten earned puzzle pieces, or to only one earned puzzle piece, rather than a bulk hundred puzzle pieces.

Once a puzzle piece 100 is earned in step 123, it can be placed in step 124. Placement of the puzzle piece 100 involves placing the earned puzzle piece 100 onto the empty space of the puzzle 99. This may occur in a variety of manners. In some embodiments, the application 111 automatically places the puzzle piece 100, either randomly or in a predetermined fashion. In other embodiments, the parent selects where the puzzle piece 100 is placed. In yet other embodiments, the child chooses where the puzzle piece 100 is placed, such as by selecting the puzzle piece 100 with her finger on the GUI and dragging the puzzle piece 100 to the location she desires on the empty puzzle 99. In embodiments in which the picture is greyed-out or shown with transparency in the background, the puzzle pieces 100 are placed atop their corresponding image locations, completing the puzzle piece-by-piece. FIG. 6B shows an embodiment of puzzle pieces 100 placed over some of the puzzle 99. The puzzles pieces 100 shown in FIG. 6B are square pieces adjacent one another and partially overlying the puzzle 99, leaving a portion of the puzzle 99 in the lower-right uncovered; in other embodiments, the puzzle pieces 100 have other shapes and sizes and other arrangements with respect to each other.

In the next step 125, the server 11 determines whether the puzzle 99 is complete. If the puzzle 99 is complete (which, at this point, would only be the case if the selected number of puzzle pieces 100 was one), then the process 110 moves to the final step 126. However, if the selected number of puzzle pieces 100 is greater than the total number of pieces which have been placed, then the puzzle 99 is not yet complete, the process 110 returns to step 123, and the child must earn another puzzle piece 100. When she does, she places that other piece 100 at step 124, and the server 11 again checks for completeness. If the puzzle 99 is not complete, the process 110 again returns to step 123. This check is performed each time a puzzle piece 100 is placed and continues until the puzzle 99 is completed.

Once the puzzle 99 is complete at step 125, the process 110 terminates at the reward or redemption step 126. In step 126, the application 111 displays the completed puzzle 99 on the GUI 113 so that the child can see that the puzzle 99 is complete and understand that she has completed everything needed to be awarded the toy plane shown in the picture. FIG. 6C shows an embodiment of such a completion page.

In some embodiments, the application 111 may play a song or a message, or may flash lights or perform some other celebratory action. In step 126, the application 111 also issues a reward or redemption instruction. In some embodiments, the reward instruction is sent to the parent so that the parent can manually reward the child by buying the goal, while in others, it is sent to the online store for automatic redemption. In embodiments in which the reward instruction is sent to the parent, the parent is told that the child has completed the puzzle and has earned the reward depicted in the picture. The parent is then responsible for obtaining the reward and giving it to the child. The application 111 may simply instruct the parent to purchase the object and provide the relevant information for the object and the online store on which the object was offered for sale. In embodiments in which the reward instruction is sent to the online store selling the object, the store is instructed that the object has been earned, and the application 111 issues a purchase and fulfillment order to the store. The store fulfills the purchase order for the object just as if the object had been purchased by a conventional consumer shopping online. The child thus redeems the object through either method of reward.

The application 111 is suitable for tracking multiple puzzles 99 for a plurality of children. For example, with reference to FIG. 4B, three user 15 accounts are shown, each of which can maintain one or several puzzles 99 in various states of completion. In a family of three children, each child may have his or her own puzzle 99, and each child may have three puzzles 99, each for a different goal. For this reason, the server also tracks and organizes puzzles as either "Active," "Completed," or "Redeemed." Active puzzles are those which have puzzles pieces left to be placed. Completed puzzles 99 are those in which no more puzzle pieces can be earned, but for which no rewards have been tendered. A redeemed puzzle 99 is one which has been completed and for which the reward has been received.

A preferred embodiment is fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

What is claimed is:

1. A system comprising:
a computer server including a server processor and non-transitory computer-readable server memory storing server instructions and a user account;
a parent device connected in data communication with the computer server;
another device including a display, the other device connected in data communication with the computer server; and
an image corresponding to a goal for a user, the server storing the image in the user account associated with the user in response to the image being uploaded to the server;
wherein, when the server processor executes the server instructions, the server processor performs the steps of:
associating the image with the user account;
converting the image into a puzzle comprising a plurality of puzzle pieces which, when fully assembled, depict the image;
displaying an empty puzzle on the other device;
receiving an instruction that one of the puzzle pieces has been redeemed, the instruction transmitted from one of: 1) the parent device in response to an input on the parent device, and 2) an external financial account linked to the user account via data communication to the server in response to a deposit at the external financial account;
filling the puzzle by placing the one of the puzzle pieces on the empty puzzle in response to receiving the instruction that the one of the puzzle pieces has been redeemed; and
repeating the steps of receiving an instruction and filling the puzzle until the empty puzzle displays the puzzle;
when the empty puzzle displays the puzzle, the computer server purchases a product corresponding to the image by automatically transmitting a purchase and fulfillment order to a third-party retail website with information for the user from the user account.

2. The system of claim 1, wherein the image is sourced from the third-party retail website hosting the image as part of a sales offering for the product corresponding to the image.

3. The system of claim 1, wherein the image is uploaded to the server from the parent device.

4. The system of claim 1, wherein the image is uploaded to the server from the third-party retail website.

5. The system of claim 1, wherein the computer server receives user input regarding a number of the puzzle pieces to comprise the puzzle.

6. The system of claim 5, wherein when the server processor converts the image into a puzzle, the server processor converts the image into a puzzle comprising the number of puzzle pieces.

7. The system of claim 1, wherein before the server processor places the one of the puzzle pieces on the empty puzzle, the one of the puzzle pieces is earned in response to the user completing a task.

8. The system of claim 1, wherein before the server processor places the one of the puzzle pieces on the empty puzzle, the one of the puzzle pieces is earned in response to the parent device transmitting an earn input to the computer server.

9. A method comprising the steps of:
providing a computer server including a server processor and non-transitory computer-readable server memory storing server instructions and a user account;
providing a parent device connected in data communication with the computer server;
providing another device including a display, the other device connected in data communication with the computer server;
the computer server receiving an image corresponding to a goal for a user and corresponding to a product available on a third-party retail website;
storing the image in the user account associated with the user in response to the image being received by the computer server; and
the server processor executing the server instructions, thereby executing the steps of:
associating the image with the user account;
converting the image into a puzzle comprising a plurality of puzzle pieces which, when fully assembled, depict the image;
displaying an empty puzzle on the other device;
receiving an instruction that one of the puzzle pieces has been redeemed, the instruction transmitted from one of: 1) the parent device in response to an input on the parent device, and 2) an external financial account linked to the user account via data communication to the server in response to a deposit at the external financial account;
placing the one of the puzzle pieces on the empty puzzle in response to receiving the instruction that the one of the puzzle pieces has been redeemed; and
repeating the steps of receiving an instruction and placing the one of the puzzle pieces until the empty puzzle displays the puzzle;
when the empty puzzle displays the puzzle, the computer server purchasing the product by automatically transmitting a purchase and fulfillment order for the product to the third-party retail website with information for the user from the user account.

10. The method of claim 9, wherein the step of receiving further comprises receiving the image from the third-party retail website hosting the image as part of a sales offering for the product corresponding to the image.

11. The method of claim 9, wherein the step of the computer server receiving an image further comprises receiving the image from the parent device.

12. The method of claim 9, further comprising the computer server receiving user input regarding a number of the puzzle pieces to comprise the puzzle.

13. The method of claim 12, wherein the step of converting the image into a puzzle further comprises converting the image into a puzzle comprising the number of puzzle pieces.

14. The method of claim 9, further comprising, before the step of placing the one of the puzzle pieces on the empty puzzle, the step of earning one of the puzzle pieces in response to the user completing a task.

15. The method of claim 9, further comprising, before the step of placing the one of the puzzle pieces on the empty puzzle, the step of earning the one of the puzzle pieces in response to the parent device transmitting an earn input to the computer server.

16. A method comprising the steps of:
providing a computer server including a server processor and non-transitory computer-readable server memory storing server instructions and a user account;

providing a parent device connected in data communication with the computer server;
providing another device including a display, the other device connected in data communication with the computer server;
the computer receiving an image corresponding to a goal for a user, wherein the image is sourced from one of the parent device and a third-party retail website;
storing the image in the user account associated with the user in response to the image being received by the computer server; and
the server processor executing the server instructions, thereby executing the steps of:
associating the image with the user account;
converting the image into a puzzle comprising a plurality of puzzle pieces which, when fully assembled, depict the image;
displaying an empty puzzle on the other device;
receiving an instruction that one of the puzzle pieces has been redeemed, the instruction transmitted from one of: 1) the parent device in response to an input on the parent device, and 2) an external financial account linked to the user account via data communication to the server in response to a deposit at the external financial account; and
solving the puzzle by:
earning one of the puzzle pieces in response to receiving an instruction that one of the puzzles pieces has been redeemed; and
placing the one of the puzzle pieces on the empty puzzle;
repeating the step of solving the puzzle until the empty puzzle displays the puzzle;
when the empty puzzle displays the puzzle, the computer server purchasing a product from the third-party retail website by automatically transmitting a purchase and fulfillment order to the third-party retail website with information for the user from the user account.

17. The method of claim 16, further comprising the step of receiving further includes receiving the image from a third-party retail website hosting the image as part of a sales offering for a product corresponding to the image.

18. The method of claim 16, wherein the instruction is transmitted from one of: 1) the parent device in response to an input on the parent device, and 2) an external financial account linked to the user account via data communication to the server in response to a deposit at the external financial account.

19. The method of claim 16, further comprising the computer server receiving user input regarding a number of the puzzle pieces to comprise the puzzle.

20. The method of claim 19, wherein the step of converting the image into a puzzle further comprises converting the image into a puzzle comprising the number of puzzle pieces.

* * * * *